(12) United States Patent
Thiers

(10) Patent No.: US 8,043,509 B2
(45) Date of Patent: Oct. 25, 2011

(54) WATER PURIFICATION SYSTEM

(75) Inventor: Eugene Thiers, San Mateo, CA (US)

(73) Assignee: Sylvan Source, Inc., San Carlos, CA (US)

( * ) Notice: Subject to any disclaimer, the term of this patent is extended or adjusted under 35 U.S.C. 154(b) by 506 days.

(21) Appl. No.: 11/994,832

(22) PCT Filed: Jun. 29, 2006

(86) PCT No.: PCT/US2006/025994
§ 371 (c)(1), (2), (4) Date: Jul. 15, 2008

(87) PCT Pub. No.: WO2007/008491
PCT Pub. Date: Jan. 18, 2007

(65) Prior Publication Data
US 2009/0101490 A1    Apr. 23, 2009

Related U.S. Application Data

(60) Provisional application No. 60/697,104, filed on Jul. 6, 2005, provisional application No. 60/697,107, filed on Jul. 6, 2005, provisional application No. 60/697,106, filed on Jul. 6, 2005, provisional application No. 60/727,106, filed on Oct. 14, 2005, provisional application No. 60/748,496, filed on Dec. 7, 2005, provisional application No. 60/778,680, filed on Mar. 3, 2006, provisional application No. 60/779,201, filed on Mar. 3, 2006.

(51) Int. Cl.
*B01D 15/00* (2006.01)

(52) U.S. Cl. ........ 210/661; 210/663; 210/669; 210/718; 210/287

(58) Field of Classification Search .................. 210/661, 210/663, 669, 718, 287
See application file for complete search history.

(56) References Cited

U.S. PATENT DOCUMENTS
3,646,906 A    3/1972    Hammer
(Continued)

FOREIGN PATENT DOCUMENTS
JP    2002-22102    1/2002

OTHER PUBLICATIONS

*Methods for the Determination of Organic Compounds in Drinking Water*, EPA/600/4-88-039, Dec. 1988, Revised, Jul. 1991.

(Continued)

*Primary Examiner* — Robert A Hopkins
(74) *Attorney, Agent, or Firm* — Davis Wright Tremaine LLP

(57) ABSTRACT

Devices and methods for water purification are provided. An improved demister (70) for removing liquid or other particles from steam is disclosed. The demister can have adjustable outlets. In other embodiments, a demister apparatus is placed, at least partially, inside a boiler apparatus (310). Additionally, a filter flow indicator (401) that provides an optical indication of the efficiency of a water filter is also provided. The filter flow indicator has a viewable side passage that connects the input and output sides of a filter unit. A weighted object, such as a ball (440), can move up and down the side passage in response to the pressure differential in the filter system. The user can determine the status of the filter by viewing the location of the weighted object in the side passage. Additionally, a device and method of adding various minerals back to purified water in order to improve the flavor of the water is described. The device and method involve the use of a ground mineral mixture, typically chosen from minerals (230,240, 250) that are common in natural springs. Pure water that runs through the mineral filter apparatus can take up some of the minerals, thus creating water that, although free from unhealthy contaminants, tastes like natural spring water.

3 Claims, 13 Drawing Sheets

U.S. PATENT DOCUMENTS

| | | | | |
|---|---|---|---|---|
| 5,211,851 | A | * | 5/1993 | Meurer ............ 210/670 |
| 2004/0039991 | A1 | | 2/2004 | Hopkins et al. |
| 2004/0039993 | A1 | | 2/2004 | Kougiouris et al. |
| 2006/0015859 | A1 | | 1/2006 | Sattler et al. |

OTHER PUBLICATIONS

*Methods for the Determination of Organic Compounds in Drinking Water—Supplement I*, EPA/600/4-90-020, Jul. 1990.

*Methods for the Determination of Organic Compounds in Drinking Water—Supplement II*, EPA/600/R-92-129, Aug. 1992.

*Methods for the Determination of Organic Compounds in Drinking Water—Supplement III*, EPA/600/R-95-131, Aug. 1995.

*Tetra-Through OctaChlorinated Dioxins and Furans by Isotope—Dilution HRGC/HRMS*, EPA/821-B-94-005, Oct. 1994.

U.S. Appl. No. 60/676,870, entitled "Solar Alignment Device," filed May 2, 2005.

U.S. Appl. No. 60/526,580, entitled "Self-cleaning Water Processing Apparatus," filed Dec. 2, 2003.

U.S. Appl. No. 60/526,530, entitled "Fully Automated Water Processing Control System," filed Dec. 2, 2003.

U.S. Appl. No. 11/255,083, entitled "Water Purification System," filed Oct. 19, 2005.

Patent Cooperation Treaty, *International Search Report*, issued in corresponding International patent application No. PCT/US06/25994, mailed on Mar. 15, 2007, 5 pages.

Mexican Patent Office, *Official Action*, issued in corresponding Mexican patent application No. MX/a/2008/000067; mailed on Jan. 25, 2011, 3 pages.

State Intellectual Property Office of People's Republic of China, *The First Office Action*, issued in corresponding Chinese patent application No. 200680024811.9; mailed on Oct. 21, 2009, 1 page.

State Intellectual Property Office of People's Republic of China, *The Second Office Action*, issued in corresponding Chinese patent application No. 200680024811.9; mailed on Jun. 22, 2011, 3 pages.

\* cited by examiner

WATER PURIFICATION SYSTEM

RELATED APPLICATIONS

The present application claims priority under 35 U.S.C. §119(e) to U.S. Provisional Application Nos. 60/697,104, filed Jul. 6, 2005; 60/697,106, filed Jul. 6, 2005; 60/697,107, filed Jul. 6, 2005; 60/778,680, filed Mar. 3, 2006, 60/779,201, filed Mar. 3, 2006; 60/727,106, filed Oct. 14, 2005; and 60/748,496, filed Dec. 7, 2005, each of which is incorporated by reference in its entirety.

FIELD OF THE INVENTION

This invention relates to the field of water purification.

BACKGROUND

Water purification technology is rapidly becoming an essential aspect of modern life as conventional water resources become increasingly scarce, municipal distribution systems for potable water deteriorate with age, and increased water usage depletes wells and reservoirs, causing saline water contamination. Additionally, further contamination of water sources is occurring from a variety of activities, which include, for example, intensive agriculture, gasoline additives, and heavy toxic metals. These issues are leading to increasing and objectionable levels of germs, bacteria, salts, MTBE, chlorates, perchlorates, arsenic, mercury, and even the chemicals used to disinfect potable water, in the water system.

Conventional technologies, such as reverse osmosis (RO), filtration, and chemical treatment are rarely able to handle the diverse range of water contaminants. Additionally, even though they are commercially available, they often require multiple treatment stages or combination of various technologies to achieve acceptable water quality. Less conventional technologies, such as ultraviolet (UV) light irradiation or ozone treatment, can be effective against viruses and bacteria, but seldom remove other contaminants, such as dissolved gases, salts, hydrocarbons, and insoluble solids. Additionally, most distillation technologies, while they may be superior at removing a subset of contaminants are frequently unable to handle all types of contaminants.

Accordingly, sophisticated distillation systems that are continuous, self-cleaning, and recover a major fraction of the input water appear as the best long-term option to resolve increasing water contamination problems and water scarcity. These distillation systems can involve numerous components, including demisters and filters.

Demisters

A demister, which can be part of such a distillation system, is capable of separating heavy particles of steam and lighter particles of steam from a mixed sample. Cyclone demisters operate by forcing contaminated steam into a curved housing, forcing the steam to take on a rotational motion within the curved housing. This rotational motion results in a centrifugal force that forces the heavier droplets of steam to the outer walls of the housing, while the lighter droplets of steam remain relatively closer to the center of the device. Thus, steam that is heavy because it is contaminated with a heavy substance can be separated from steam that is not contaminated with the substance.

To take advantage of this separation of "clean" and "dirty" steam, demisters typically have a downcomer tube in the center of the top of the curved housing, providing an exit pathway for clean steam to leave the housing. Additionally, there is normally a second exit in the demister on the opposite side of the housing from the downcomer tube. It is through this second exit that the dirty steam can leave the demister.

Filter Flow Indicators

Another part that is frequently involved in distillation systems are liquid filtration devices. Examples of such devices include devices that allow only particles of a certain size to pass, filters that remove particulates, filters that remove molecules of particular chemistries, and devices that purify contaminants from water.

Some filter configurations are simple mechanical devices that capture particulates from the water stream and thereby remove such particulates from the water product. Still other devices utilize adsorbents, such as activated carbon, to physically adsorb impurities that are dissolved in the water stream thereby purifying it. Other filter devices are complex systems that use multiple types of filter cartridges and have elaborate electronic control systems to indicate to the user when problems are occurring.

One recurrent problem with many types of filter devices is that the filter unit can become clogged with the matter that is being removed from the liquid. It is often difficult to determine at what point the filter becomes too clogged to function properly. Unfortunately, for many types of filter devices, a clogged filter that is not attended to can break, allowing leakage of the filtered materials into the filtered liquid. Often, this can happen without warning and compromise water quality.

Many types of monitoring systems have been developed to determine the status of a filter unit and to warn the user when the filter is not working effectively. Typical sensor systems include electronic and pressure sensors to indicate when the filter has been clogged and needs either cleaning or replacement. These types of sensor systems can be generally elaborate and expensive.

Product Water Characteristics

The concern for water purity has resulted in the purification aspects and devices described above. Some of these devices assert to eliminate selective impurities that are commonly found in tap water, but that are detrimental to human health. Although water that has been treated so that it is chemically pure will lessen a consumer's water purity concerns, many consumers hold the opinion that the chemically pure water is tasteless and "flat." Additionally, many consumers desire the presence of certain beneficial minerals in their drinking water.

Spring water is a popular choice for drinking water, as the minerals provide an amount of flavor to the water that chemically purified water does not have. Additionally, spring water contains certain dissolved gasses that also improve the flavor of the water.

SUMMARY

Many currently used demister designs suffer from inadequate understanding of the principles of operation of gas cyclones. As a result, pressure loss, adequate residence time to effect separation of clean from contaminated steam, and partition coefficients that determine the amount of clean and contaminated steam that is obtained are not adequately dealt with. Additionally, there is a need for a cyclone demister that is compact, that is adjustable so as to operate under varying conditions (e.g., at high altitudes), and that is well insulated so that there is preferably no condensation of water within the unit.

In some aspects of the present invention, a demister is provided that is located within a boiler. The demister can be located completely within the boiler, only about the boiler on one surface or part of a surface, or have any association between these two extremes. For example, 100-90, 90-80, 80-50, 50-30, 20-10, 10-0% of the volume or surface area of the demister can be contained within the boiler. In one embodiment, none of the volume of the demister is within the boiler, but the bottom surface of the demister shares a surface with the upper surface of the boiler. In a preferred embodiment, the demister is arranged within the boiler so that substantially an entire volume of the demister can be heated by the boiler. In a more preferred embodiment, the demister is positioned within the boiler so that a bottom surface and the side surface of the demister are heated by the boiler. In some embodiments, the demister is made from a material that readily transmits heat from the boiler to the inside of the demister. Thus, the material making up the shell of the demister can readily transmit heat. In some embodiments, the demister is configured so that the heat from the boiler can assist in preventing condensation of water in the demister.

In some aspects, the demister chamber includes a first outlet for reject steam that can be adjustable, for example, through the use of an adjustable shutter. However, if desired, the adjustable shutter can be fixed in a permanent position.

In some aspects, the demister chamber includes an outlet for clean steam, or a downcomer tube. The downcomer tube can be adjustable and fixable in a permanent position if so desired.

In additional embodiments of the present invention, a demister is provided, having a demister chamber that has an inlet for steam, which is positioned on the demister chamber such that steam from the boiler is forced into a rotational motion in the demister chamber, a first outlet for reject steam which has an adjustable shutter mechanism, and a second outlet for clean steam, which is located at a top portion of the demister chamber and has an adjustable downcomer tube and the majority of the external surface area of the demister is located within a boiler.

In other aspects of the invention, what is needed is a simple, inexpensive method of visually indicating the degree of impairment of filtering function.

In some embodiments, the invention is a filter flow indicator that functions by moving a visual indicator based on differences in pressure between two sides of a filter.

In some embodiments, the filter flow indicator includes a viewable side passage that connects an input and an output side of a filter unit. A weighted object, such as a ball, can move up and down the side passage in response to the pressure differential in the filter system. The user can determine the status of the filter by viewing the location of the weighted object in the side passage.

In some embodiments of the invention, a filter flow indicator includes a side passage that connects a first volume on one side of the filter to a second volume on the other side of the filter. The interior space of the side passage is visible from the exterior of the side passage. A moveable, weighted object is present within the side passage. The device is configured so that movement of the weighted object occurs based upon a change in pressure between the first volume and the second volume and the movement occurs against the force of gravity. The filter unit that is used can be a cartridge unit, such as from commercial sources. The filter unit can also be composed of two interlocking connectors fitted with a removable filter fitting. The filter unit, side passage, and weighted object can be made of any suitable material. Preferably, the weighted object is spherical or nearly so. The side passage can be cylindrical, and can be made, for example, from a transparent material.

In additional embodiments of the invention, the filter flow indicator is part of the filter itself and has two interlocking connectors that are oriented so that the flow of water is vertical, a filtering section is placed between the interlocking connectors. There is a cylindrical transparent side passage that connects a volume on a first side of the filtering section to a volume on an opposite side of the filtering section. Additionally, there is a weighted ball having a diameter slightly smaller than a diameter of the interior of the cylindrical side passage, and a pin bisects a portion of the side passage distal to the incoming flow of liquid so that the ball cannot go past the pin, while liquid can freely flow around the pin. In a preferred embodiment, the ball is colored so as to be visually distinctive and the interlocking connectors are made of plastic.

When using some of the above devices, or other purification devices, the water produced can be bland. Thus, in some aspects, the present invention is directed producing water that is free from undesirable contaminants, yet tastes good. Thus, what is needed is a mechanism and method to restore useful dissolved minerals to purified water, additionally allowing for the dissolution of air, so as to mimic the composition of spring waters.

In some embodiments of the present invention, a flavor enhancing reverse-filter is provided. In some embodiments, the reverse-filter has a chamber with particles in it. Water can flow through the chamber, but the particles will not leave with the water. The chamber contains an assortment of particles that will provide flavor to water that is passed through the reverse-filter. In one embodiment, the chamber contains a variety of minerals that can be dissolved in the water that is passing through the chamber, thereby adding mineral or other content to the water. In some embodiments, the minerals can include at least one of, for example, Andalusite: $Al_2OSiO_4$; Anorthite: $CaAl_2Si_2O_3$; Anthophyllite: $(Mg,Fe)_7Si_3O_{22}(OH,F)_2$; Apatite: $Ca_5(PO_4)_3(OH,F,Cl)$; Biotite: $K(Mg,Fe)_3AlSiO_3O_{10}(OH,F)_2$; Chlorite: $(Mg,Al,Fe)_{12}(Si,Al)_8O_{20}(OH)_{16}$; Cordierite: $Al_3(Mg,Fe)_2Si_5Al_2O_{18}$; Dolomite: $CaMg(CO3)_2$; Hornblende: $(Ca,Na,K)_{2-3}(Mg,FeFe^{3+}Al)_5Si_6(Si,Al)_2O_{22}(OH,F)_2$; Magnesite: $MgCO_3$; Olivine: $(Mg,Fe)SiO_4$; or Talc: $Mg_3Si_4O_{10}(OH)_2$; and the like, or any combination of these minerals. In general any of the silicates and most of the insoluble carbonates and sulfates could be used.

In an additional embodiment of the invention, a mineral-based, water-flavor enhancer is provided as part of a water purification device. The complete device of this embodiment includes a condenser, a conductivity meter which is in fluid communication with the condenser, and a mineral chamber containing an assortment of minerals. The mineral chamber is in fluid communication with the condenser. The variety of minerals can include at least one of, for example, Andalusite: $Al_2OSiO_4$; Anorthite: $CaAl_2Si_2O_3$; Anthophyllite: $(Mg,Fe)_7Si_3O_{22}(OH,F)_2$; Apatite: $Ca_5(PO_4)_3(OH,F,Cl)$; Biotite: $K(Mg,Fe)_3AlSiO_3O_{10}(OH,F)_2$; Chlorite: $(Mg,Al,Fe)_{12}(Si,Al)_8O_{20}(OH)_{16}$; Cordierite: $Al_3(Mg,Fe)_2Si_5Al_2O_{18}$; Dolomite: $CaMg(CO3)_2$; Hornblende: $(Ca,Na,K)_{2-3}(Mg,FeFe^{3+}Al)_5Si_6(Si,Al)_2O_{22}(OH,F)_2$; Magnesite: $MgCO_3$, Olivine: $(Mg,Fe)SiO_4$; or Talc: $Mg_3Si_4O_{10}(OH)_2$; or some combination of these. These minerals are in the correct quantities and largely in the correct particle size so as to flavor water passing through the mineral chamber to taste similar to that of a desired spring water. In some embodiments, the size of the particles and the temperature of the water or the reverse-filter are set based on the desired rate of flow through of the water.

In an alternative embodiment of the invention, a method is provided for creating mineral-rich water. Water is run through the reverse-filter described above. In another embodiment, water is first purified in a method that involves a heating process. This relatively warm, purified water is then run through the filter before it cools to room temperature, thereby assisting the water in dissolving the particles that contain the flavoring for the water.

Other embodiments of the present invention provide an improved water purification system. In some embodiments, the system includes the above mentioned aspects, such as a reverse-filter, located distally to a demister, which is part of a device that also includes a filter flow indicator. In some embodiments, the general water purification system can include an inlet, a preheater, a degasser, an evaporation chamber, a demister, a product condenser, a waste outlet, a product outlet, and a control system. The control system permits operation of the purification system through repeated cycles without requiring user intervention or cleaning. The system is capable of removing, from a contaminated water sample, a plurality of contaminant types including microbiological contaminants, radiological contaminants, metals, salts, volatile organics, and non-volatile organics; such that water purified in the system has levels of all contaminant types below the levels shown in Tables 1, 2, or 3 when the contaminated water has levels of the contaminant types that are up to 25 times greater than the levels shown in Table 1, 2, or 3. In embodiments of the system, the volume of water produced can be between about 20% and about 95% of a volume of input water. The system does not require cleaning through at least about two months, six months, one year of use, or more.

In some embodiments, a drinking water, water purification device is provided. The device includes a boiling chamber, a degasser in liquid communication with the boiling chamber, a water input pipe in fluid communication the boiling chamber, a water filter positioned inside of the input pipe, a pressure indicator associated with the filter and the pipe, a demister in vapor communication with the boiling chamber, and a reverse filter in vapor or liquid communication with the demister. The pressure indicator includes 1) a side passage that connects a first volume of the input pipe to a second volume of the input pipe, wherein the first and second volumes are separated by the water filter, wherein an interior space of the side passage is visible from the exterior of the side passage; and 2) a weighted object in the side passage that is moveable within the side passage, and wherein the movement occurs based upon a change in pressure between the first volume and the second volume. The demister includes 1) an inlet for steam, the inlet positioned on the demister chamber so that steam from the boiling chamber is forced into a rotational motion in the demister chamber; 2) a first outlet for reject steam, wherein the outlet includes an adjustable shutter mechanism; and 3) a second outlet for clean steam, wherein the second outlet is located at a top portion of the demister chamber, wherein the second outlet includes an adjustable downcomer tube, and wherein the demister chamber is located within the boiling chamber. The reverse mineral filter includes 1) a chamber through which water can flow but resident particles will not exit; and 2) an assortment of resident particles, the resident particles including at least one mineral dissolvable in water passing through the chamber.

BRIEF DESCRIPTION OF THE DRAWINGS

FIG. 10B also shows the method of assembly of an exemplary embodiment of the present invention.

DETAILED DESCRIPTION

Figure 1:
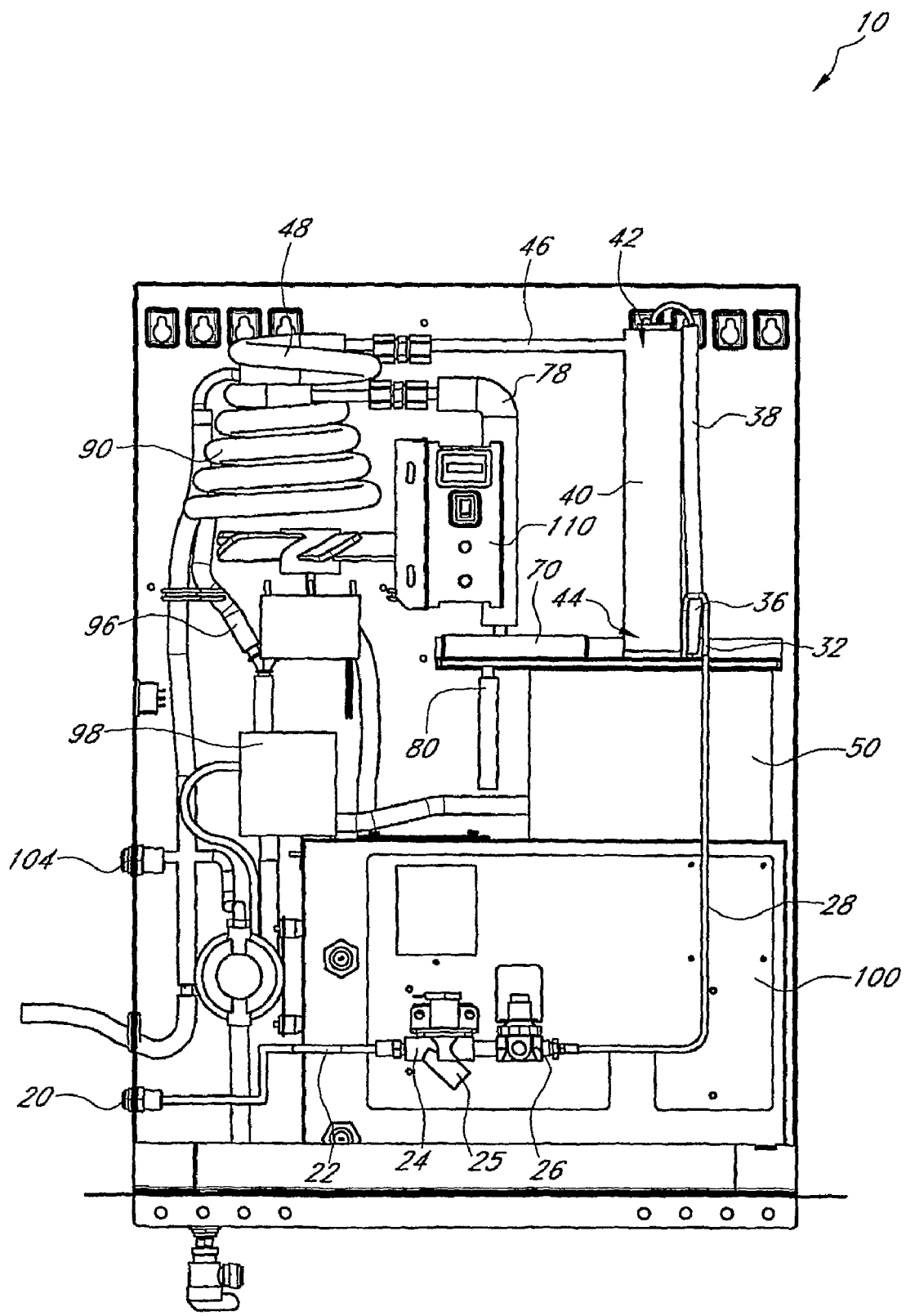
FIG. 1 is a front view of an embodiment of the water purification system.
Figure 2:
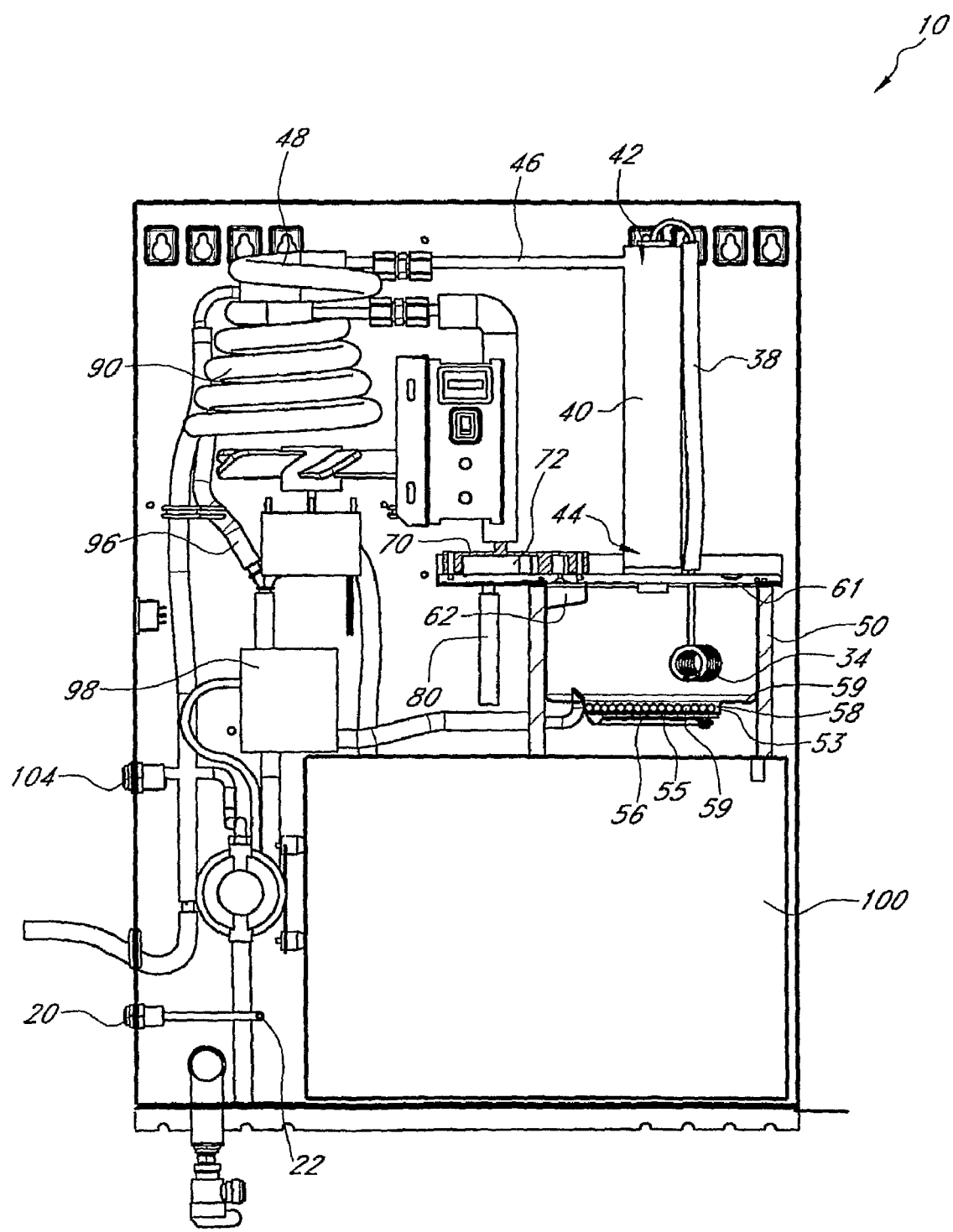
FIG. 2 is a sectional front view of an embodiment of the water purification system.
Figure 3:
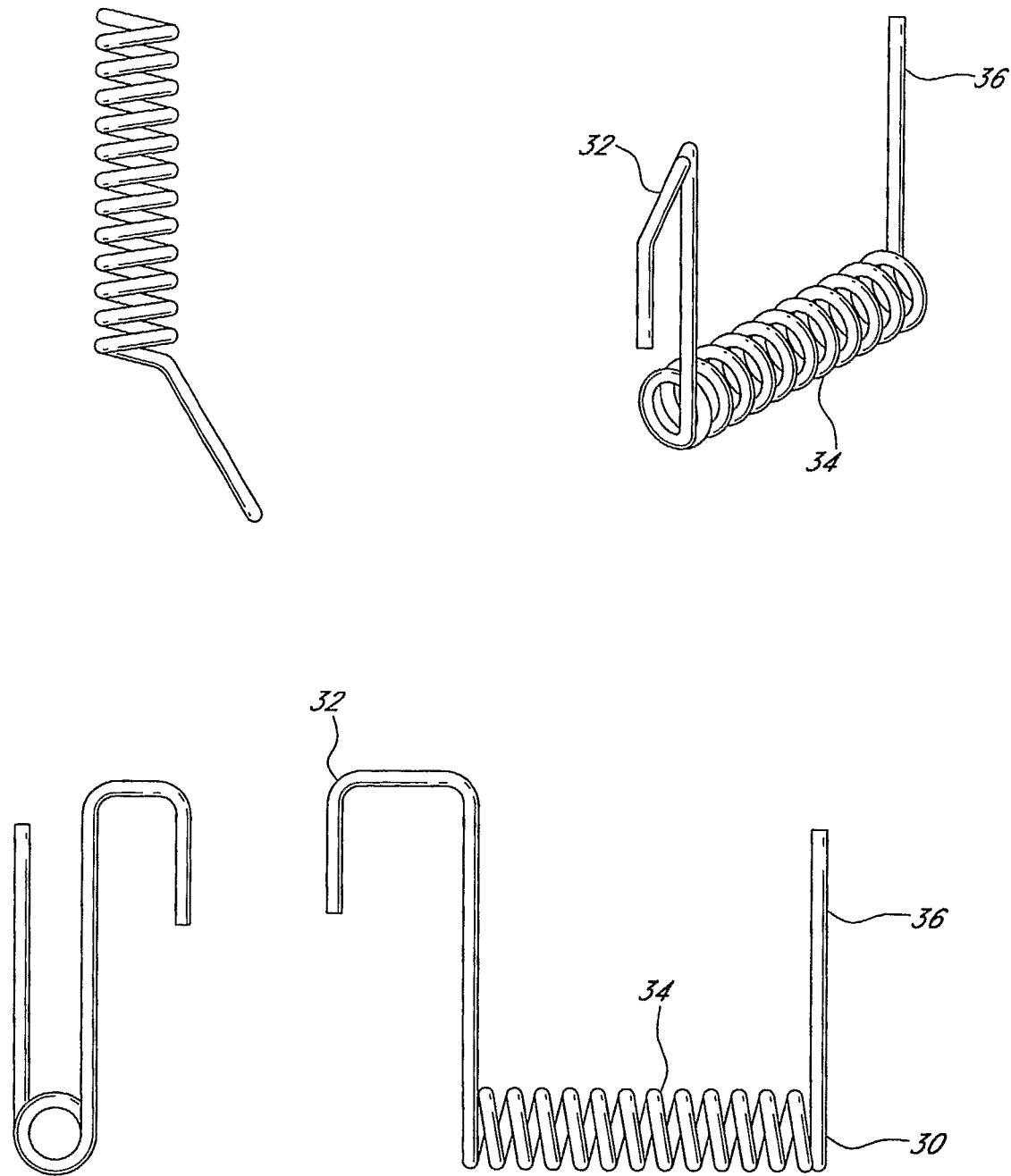
FIG. 3 is a diagram showing detail of the preheater.
Figure 4:
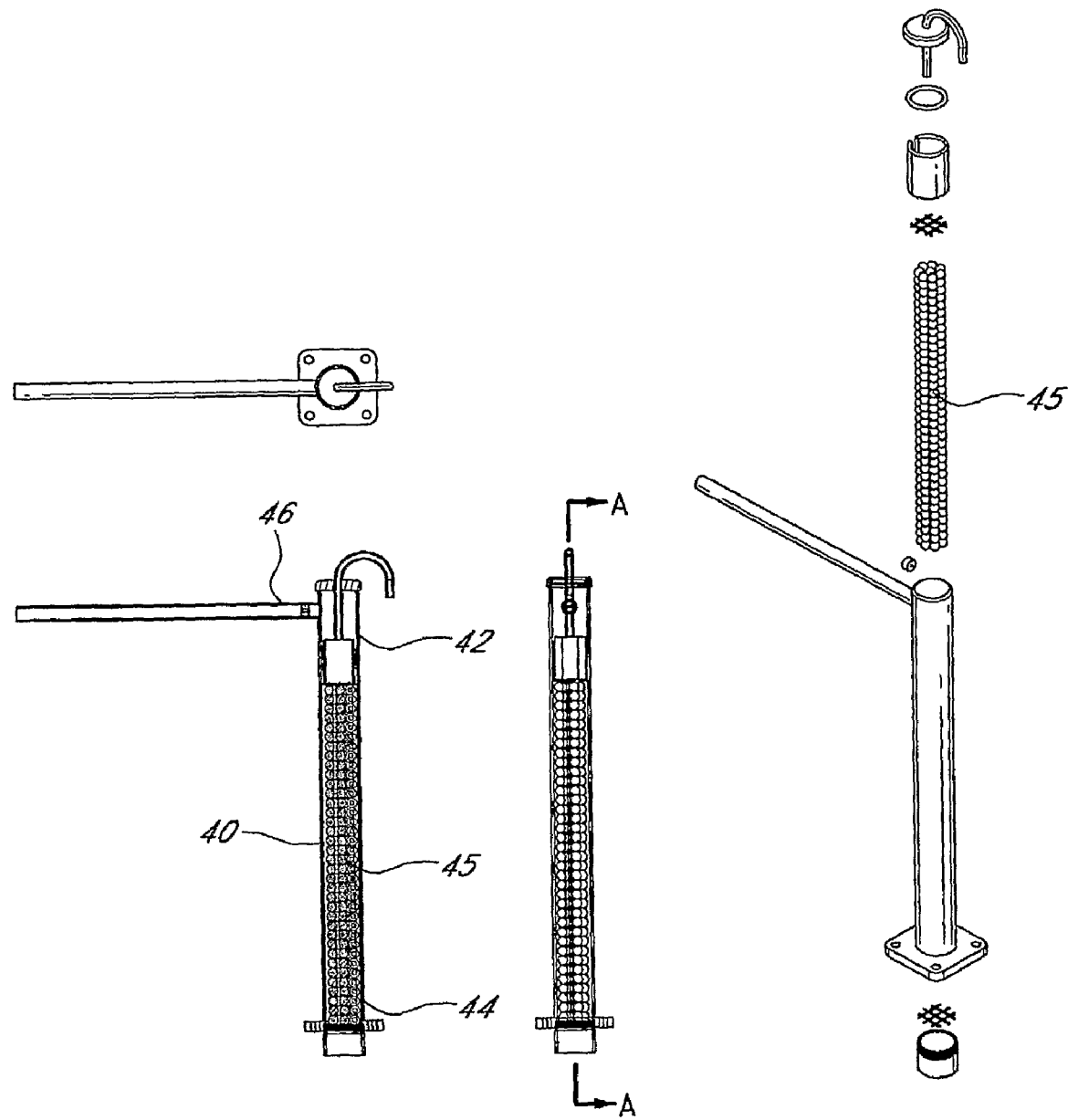
FIG. 4 is a diagram showing detail of the degasser.
Figure 5:
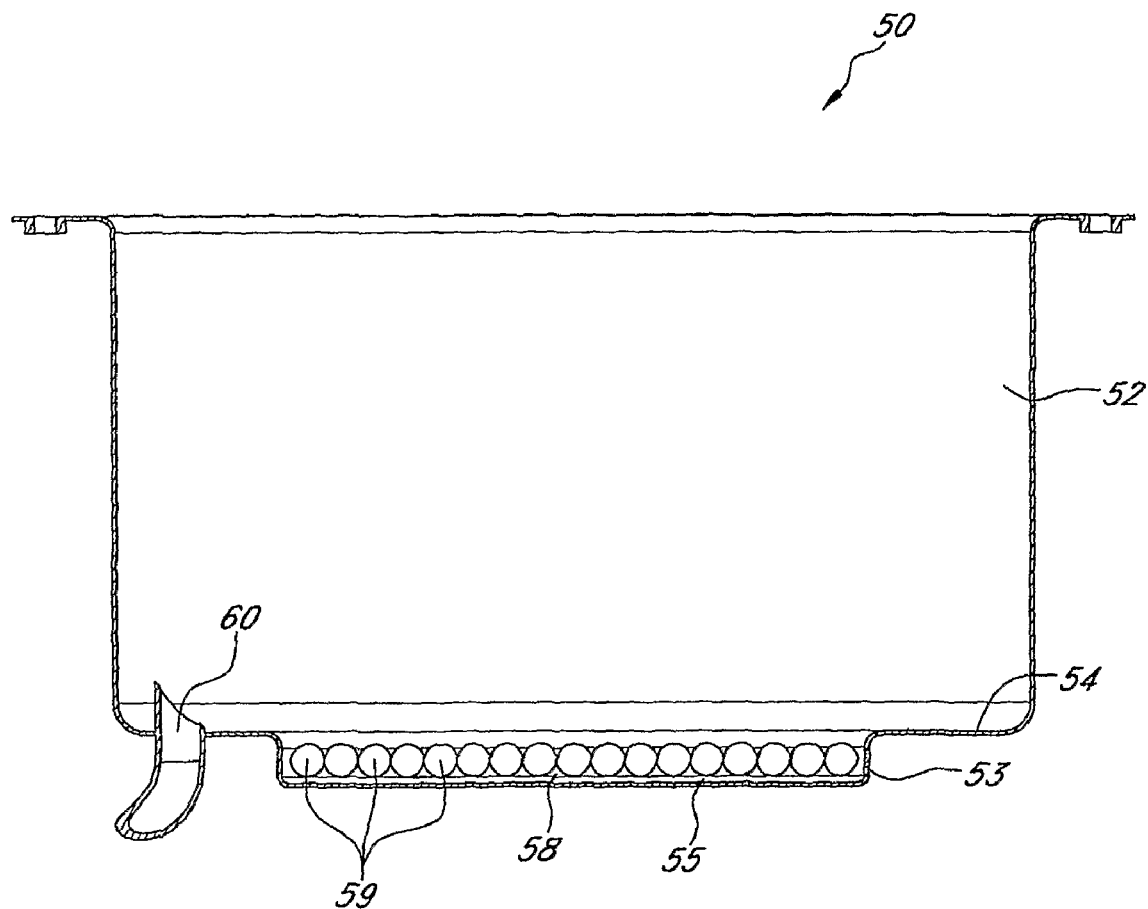
FIG. 5 is a diagram showing detail of the evaporation chamber.
Figure 6:
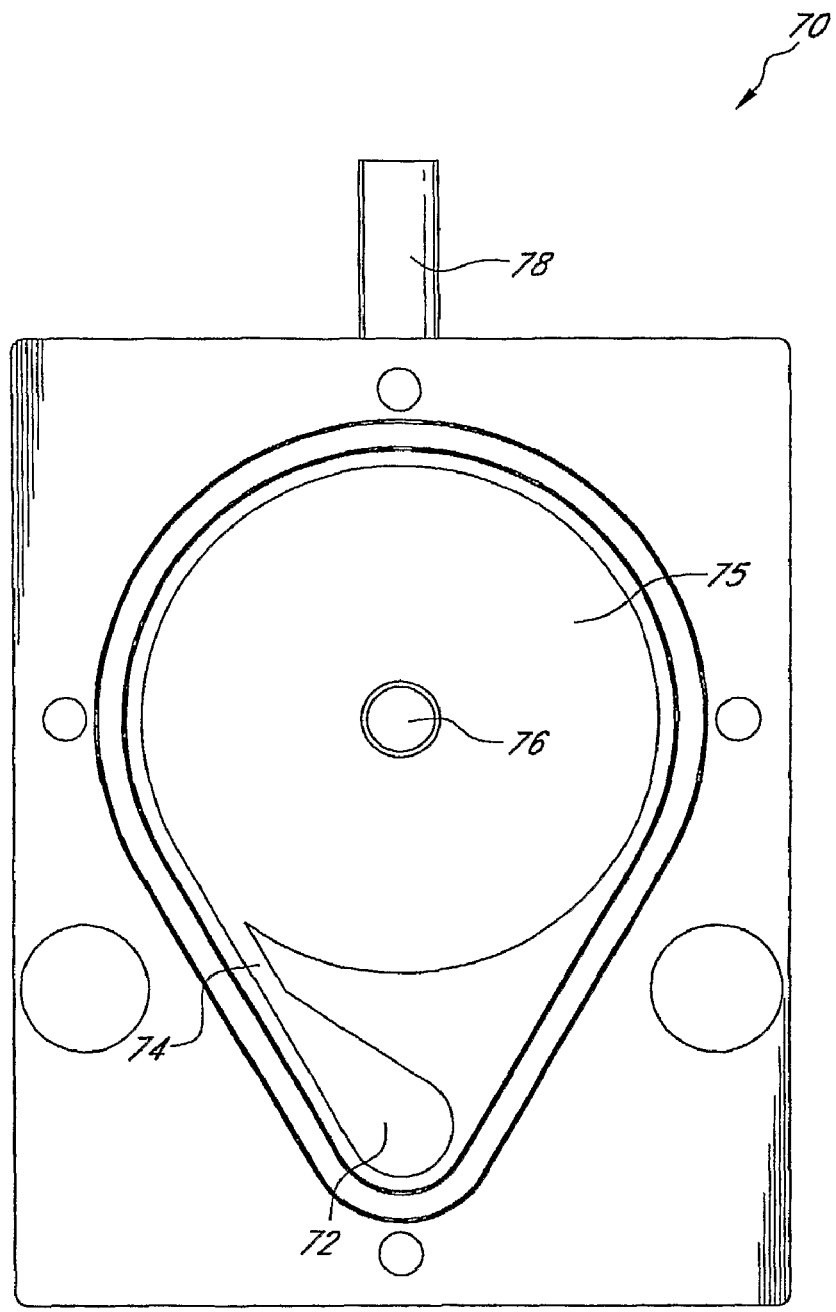
FIG. 6 is a diagram showing detail of the cyclone demister.

Embodiments of the invention are disclosed herein, in some cases in exemplary form or by reference to one or more Figures. However, any such disclosure of a particular embodiment is exemplary only, and is not indicative of the full scope of the invention. In general, the various inventions involve or relate to a water (or any general liquid) purification system. In some embodiments, the disclosed inventions relate to demisters, filter flow indicators, and reverse-filter devices. In some embodiments the various inventions can be combined with a purification system, which is described below. In other embodiments, the various inventions are simply combined with each other. In other embodiments, the devices are employed separately from each other or separately from liquid purification.

Water Purification Systems

Some embodiments of the invention include systems, methods, and apparatus for water purification. Preferred embodiments provide broad spectrum water purification that is fully automated and that does not require cleaning or user intervention over very long periods of time. For example, systems disclosed herein can run without user control or intervention for 2, 4, 6, 8, 10, or 12 months, or longer. In preferred embodiments, the systems can run automatically for 1, 2, 3, 4, 5, 6, 7, 8, 9, 10, 11, 12, 13, 14, or 15 years, or more.

Some embodiments of the invention thus provide a water purification system including at least an inlet, a preheater, a degasser, an evaporation chamber (e.g., a boiler), a demister, a product condenser, a waste outlet, a product outlet, and a control system, wherein product water exiting the outlet is substantially pure, and wherein a volume of product water produced is at least about 10, 15, or 20% of a volume of input water, and wherein the control system permits operation of the purification system through repeated cycles without requiring user intervention. In preferred embodiments, the volume of product water produced is at least about 25, 30, 35, 40, 45, 50, 55, 60, 65, 70, 75, 80, 85, 90, 95, 96, 97, 98, or 99%, or more, of the volume of input water. Thus the system is of great benefit in conditions in which there is relatively high expense or inconvenience associated with obtaining inlet water and/or disposing of wastewater. The system is significantly more efficient in terms of its production of product water per unit of input water or wastewater, than many other systems.

Substantially pure water can be, in different embodiments, water that meets any of the following criteria: water purified to a purity, with respect to any contaminant, that is at least 25, 30, 35, 40, 45, 50, 55, 60, 65, 70, 75, 80, 85, 90, 95, 100, 125, 150, 175, 200, 250, 500, 750, 1000, or more, times greater purity than the inlet water. In other embodiments, substantially pure water is water that is purified to one of the foregoing levels, with respect to a plurality of contaminants present in the inlet water. That is, in these embodiments, water purity or quality is a function of the concentration of an array of one or more contaminants, and substantially pure water is water that has, for example, a 25-fold or greater ratio between the concentration of these contaminants in the inlet water as compared to the concentration of the same contaminants in the product water.

In other embodiments, water purity can be measured by conductivity, where ultrapure water has a conductivity typically less than about 1 μSiemens, and distilled water typically has a conductivity of about 5. In such embodiments, conductivity of the product water is generally between about 1 and 7, typically between about 2 and 6, preferably between about 2 and 5, 2 and 4, or 2 and 3. Conductivity is a measure of total dissolved solids (TDS) and is a good indicator of water purity with respect to salts, ions, minerals, and the like.

Alternatively, water purity can be measured by various standards such as, for example, current EPA standards as listed in Table 1 and Table 2, as well as other accepted standards as listed in Table 2. Accordingly, preferred embodiments of the invention are capable of reducing any of one or more contaminants from a broad range of contaminants, including for example any contaminant(s) listed in Table 1, wherein the final product water has a level for such contaminant(s) at or below the level specified in the column labeled "MCL" where the inlet water has a level for such contaminant(s) that is up to about 25-fold greater than the specified MCL. Likewise, in some embodiments and for some contaminants, systems of the invention can remove contaminants to MCL levels when the inlet water has a 30-, 40-, 50-, 60-, 70-, 80-, 90-, 100-, 150-, 250-, 500-, or 1000-fold or more; higher contamination than the MCL or the product water.

While the capacity of any system to remove contaminants from inlet water is to some extent a function of the total impurity levels in the inlet water, systems of the invention are particularly well suited to remove a plurality of different contaminants, of widely different types, from a single feed stream, producing water that is comparable to distilled water and is in some cases comparable to ultrapure water. It should be noted that the "Challenge Water" column in Table 1 contains concentration levels for contaminants in water used in EPA tests. Preferred embodiments of water purification systems of the invention typically can remove much greater amounts of initial contaminants than the amounts listed in this column. However, of course, contaminant levels corresponding to those mentioned in the "Challenge Water" column are likewise well within the scope of the capabilities of embodiments of the invention.

TABLE 1

|  | Units | Protocol | MCL | Challenge Water |
|---|---|---|---|---|
| Metals | | | | |
| Aluminum | Ppm | | 0.2 | 0.6 |
| Antimony | Ppm | | 0.006 | 0.1 |
| Arsenic | Ppm | | 0.01 | 0.1 |
| Beryllium | Ppm | | 0.004 | 0.1 |
| Boron | Ppb | | | 20 |
| Chromium | Ppm | | 0.1 | 0.1 |
| Copper | Ppm | | 1.3 | 1.3 |
| Iron | Ppm | | 0.3 | 8 |
| Lead | Ppm | | 0.015 | 0.1 |
| Manganese | ppm | | 0.05 | 1 |
| Mercury | ppm | | 0.002 | 0.1 |
| Molybdenum | ppm | | | 0.01 |
| Nickel | ppm | | | 0.02 |
| Silver | ppm | | 0.1 | 0.2 |
| Thallium | ppm | | 0.002 | 0.01 |
| Vanadium | ppm | | | 0.1 |
| Zinc | ppm | | 5 | 5 |
| Subtotal of entire mix | | | | 36.84 |
| Inorganic salts | | | | |
| Bromide | ppm | | | 0.5 |
| Chloride | ppm | | 250 | 350 |
| Cyanide | ppm | | 0.2 | 0.4 |
| Fluoride | ppm | | 4 | 8 |
| Nitrate, as NO3 | ppm | | 10 | 90 |
| Nitrite, as N2 | ppm | | 1 | 2 |
| Sulfate | ppm | | 250 | 350 |
| Subtotal of entire mix | | | | 800.9 |
| Fourth Group: 2 Highly volatile VOCs + 2 non-volatiles | | | | |
| Heptachlor | ppm | EPA525.2 | 0.0004 | 0.04 |
| Tetrachloroethylene-PCE | ppm | EPA524.2 | 0.00006 | 0.02 |

TABLE 1-continued

| | Units | Protocol | MCL | Challenge Water |
|---|---|---|---|---|
| Epichlorohydrin | ppm | | 0.07 | 0.2 |
| Pentachlorophenol | ppm | EPA515.4 | 0.001 | 0.1 |
| Subtotal of entire mix | | | | 0.36 |
| Fifth Group: 2 Highly volatile VOCs + 2 non-volatiles | | | | |
| Carbon tetrachloride | ppm | EPA524.2 | 0.005 | 0.01 |
| m,p-Xylenes | ppm | EPA524.2 | 10 | 20 |
| Di(2-ethylhexyl) adipate | ppm | EPA525.2 | 0.4 | 0.8 |
| Trichloro acetic acid | ppm | SM6251B | 0.06 | 0.12 |
| Subtotal of entire mix | | | | 21.29 |
| Sixth Group: 3 Highly volatile VOCs + 3 non-volatiles | | | | |
| 1,1-dichloroethylene | ppm | | 0.007 | 0.15 |
| Ethylbenzene | ppm | EP524.2 | 0.7 | 1.5 |
| Aldrin | ppm | EPA505 | 0.005 | 0.1 |
| Dalapon (2,2,-Dichloropropionic acid) | ppm | EPA515.4 | 0.2 | 0.4 |
| Carbofuran (Furadan) | ppm | EPA531.2 | 0.04 | 0.1 |
| 2,4,5-TP (silvex) | ppm | EPA515.4 | 0.05 | 0.1 |
| Subtotal of entire mix | | | | 2.35 |
| Seventh Group: 3 Highly volatile VOCs + 3 non-volatiles | | | | |
| Trichloroethylene-TCE | ppm | EPA524.2 | 0.005 | 0.1 |
| Toluene | ppm | EPA524.2 | 1 | 2 |
| 1,2,4 Trichlorobenzene | ppm | EPA524.2 | 0.07 | 0.15 |
| 2,4-D | ppm | EPA515.4 | 0.07 | 0.15 |
| Alachlor (Alanex) | ppm | EPA525.2 | 0.002 | 0.1 |
| Simazine | ppm | EPA525.2 | 0.004 | 0.1 |
| Subtotal of entire mix | | | | 2.6 |
| Eighth Group: 3 Highly volatile VOCs + 3 non-volatiles | | | | |
| Vinylchloride (chloroethene) | ppm | EPA524.2 | 0.002 | 0.1 |
| 1,2-dichlorobenzene (1,2 DCB) | ppm | EPA524.2 | 0.6 | 1 |
| Chlorobenzene | ppm | EPA524.2 | 0.1 | 0.2 |
| Atrazine | ppm | EPA525.2 | 0.003 | 0.1 |
| Endothal | ppm | EPA548.1 | 0.01 | 0.2 |
| Oxamyl (Vydate) | ppm | EPA531.2 | 0.2 | 0.4 |
| Subtotal of entire mix | | | | 2 |
| Ninth Group: 3 Highly volatile VOCs + 3 non-volatiles | | | | |
| Styrene | ppm | EPA524.2 | 0.1 | 1 |
| Benzene | ppm | EPA524.2 | 0.005 | 0.2 |
| Methoxychlor | ppm | EPA525.2/505 | 0.04 | 0.1 |
| Glyphosate | ppm | EPA547 | 0.7 | 1.5 |
| Pichloram | ppm | EPA515.4 | 0.5 | 1 |
| 1,3-dichlorobenzene (1,3 DCB) | ppm | EPA524.2 | 0.075 | 0.15 |
| Subtotal of entire mix | | | | 3.95 |
| Tenth Group: 3 Highly volatile VOCs + 3 non-volatiles | | | | |
| 1,2-dichloropropane (DCP) | ppm | EPA524.2 | 0.005 | 0.1 |
| Chloroform | ppm | EPA524.2 | 80 | 0.1 |
| Bromomethane (methyl bromide) | ppm | EPA524.2 | | 0.1 |
| PCB1242 Arochlor | ppb | EPA 505 | 0.5 | 1 |
| Chlordane | ppm | EPA525.2/505 | 0.002 | 0.2 |
| MEK—Methylehtylketone (2-butanone) | ppb | EPA524.2 | | 0.2 |
| Subtotal of entire mix | | | | 1.7 |
| Eleventh Group: 4 volatile VOCs + 5 non-volatile PCBs | | | | |
| 2,4-DDE (dichlorodiphenyl dichloroethylene) | ppm | EPA525.2 | | 0.1 |
| Bromodichloromethane | ppb | EPA524.2 | 80 | 0.1 |
| 1,1,1-Trichloroethane (TCA) | ppm | EPA524.2 | 0.2 | 0.4 |
| Bromoform | ppm | EPA524.2 | 80 | 0.1 |
| PCB 1221 Arochlor | ppm | EPA505 | 0.5 | 0.05 |
| PCB1260 Arochlor | ppm | EPA505 | 0.5 | 0.05 |

TABLE 1-continued

|  | Units | Protocol | MCL | Challenge Water |
|---|---|---|---|---|
| PCB 1232 Arochlor | ppm | EPA505 | 0.5 | 0.05 |
| PCB 1254 Arochlor | ppm | EPA505 | 0.5 | 0.05 |
| PCB1016 Arochlor | ppm | EPA505 | 0.5 | 0.05 |
| Subtotal of entire mix |  |  |  | 0.95 |
| Group No 12: 5 volatile VOCs + 5 non-volatile PCBs |  |  |  |  |
| dichloromethane (DCM) Methylenechloride | ppm | EPA524.2 | 0.005 | 0.1 |
| 1,2-dichloroethane | ppm |  | 0.005 | 0.1 |
| Lindane (gamma BHC) | ppm | EPA525.2 | 0.0002 | 0.05 |
| Benzo(a) pyrene | ppm | EPA525.2 | 0.0002 | 0.05 |
| Endrin | ppm | EPA525.2/505 | 0.002 | 0.05 |
| 1,1,2-Trichloroethane (TCA) | ppm | EPA524.2 | 0.005 | 0.05 |
| MTBE | ppm | EPA524.2 |  | 0.05 |
| Ethylene dibromide—EDB | ppm | EPA504.1 | 0.00005 | 0.05 |
| Dinoseb | ppm | EPA 515.4 | 0.007 | 0.05 |
| Di(2-ethylhexyl) phthalate (DEHP) | ppm | EPA525.2 | 0.006 | 0.05 |
| Subtotal of entire mix |  |  |  | 0.5 |
| Group No 13: Balance of 6 VOCs |  |  |  |  |
| Chloromethane (methyl chloride) | ppm | EPA524.2 |  | 0.1 |
| Toxaphene | ppm | EPA 505 | 0.003 | 0.1 |
| trans-1,2-dichloroethylene | ppm | EPA524.2 | 0.1 | 0.2 |
| Dibromochloromethane | ppm | EPA524.2 | 80 | 0.05 |
| cis-1,2-dichloroethylene | ppm | EPA524.2 | 0.07 | 0.05 |
| 1,2-Dibromo-3-Chloro propane | ppm | EPA504.1 | 0.0002 | 0.05 |
| Subtotal of entire mix |  |  |  | 0.55 |

Determination of water purity and/or efficiency of purification performance can be based upon the ability of a system to remove a broad range of contaminants. For many biological contaminants, the objective is to remove substantially all live contaminants. Table 2 lists additional common contaminants of source water and standard protocols for testing levels of the contaminants. The protocols listed in Tables 1 and 2, are publicly available at hypertext transfer protocol www.epa.gov/safewater/mcl.html#mcls for common water contaminants; Methods for the Determination of Organic Compounds in Drinking Water, EPA/600/488-039, December 1988, Revised, July 1991. Methods 547, 550 and 550.1 are in Methods for the Determination of Organic Compounds in Drinking Water—Supplement I, EPA/600-4-90-020, July 1990. Methods 548.1, 549.1, 552.1 and 555 are in Methods for the Determination of Organic Compounds in Drinking Water—Supplement II, EPA/600/R-92-129, August 1992. Methods 502.2, 504.1, 505, 506, 507, 508, 508.1, 515.2, 524.2 525.2, 531.1, 551.1 and 552.2 are in Methods for the Determination of Organic Compounds in Drinking Water—Supplement III, EPA/600/R-95-131, August 1995. Method 1613 is titled "Tetra-through OctaChlorinated Dioxins and Furans by Isotope-Dilution HRGC/HRMS", EPA/821-B-94-005, October 1994. Each of the foregoing is incorporated herein by reference in its entirety.

TABLE 2

|  |  | Protocol |
|---|---|---|
| 1 | Metals & Inorganics |  |
|  | Asbestos | EPA100.2 |
|  | Free Cyanide | SM4500CN-F |
|  | Metals—Al, Sb, Be, B, Fe, Mn, Mo, Ni, Ag, Tl, V, Zn | EPA200.7/200.8 |
|  | Anions—$NO_3$—N, $NO_2$—N, Cl, $SO_4$, Total Nitrate/Nitrite | EPA300.0A |
|  | Bromide | EPA300.0/300.1 |
|  | Turbidity | EPA180.1 |
| 2 | Organics |  |
|  | Volatile Organics—VOASDWA list + Nitrozbenzene | EPA524.2 |
|  | EDB & DBCP | EPA504.1 |
|  | Semivolatile Organics—ML525 list + EPTC | EPA525.2 |
|  | Pesticides and PCBs | EPA505 |
|  | Herbicides—Regulated/Unregulated compounds | EPA515.4 |
|  | Carbamates | EPA531.2 |
|  | Glyphosate | EPA547 |
|  | Diquat | EPA549.2 |
|  | Dioxin | EPA1613b |
|  | 1,4-Dioxane | EPA8270m |
|  | NDMA—2 ppt MRL | EPA1625 |
| 3 | Radiologicals |  |
|  | Gross Alpha & Beta | EPA900.0 |
|  | Radium 226 | EPA903.1 |
|  | Uranium | EPA200.8 |
| 4 | Disinfection By-Products |  |
|  | THMs/HANs/HKs | EPA551.1 |
|  | HAAs | EPA6251B |
|  | Aldehydes | SM6252m |
|  | Chloral Hydrate | EPA551.1 |
|  | Chloramines | SM4500 |
|  | Cyanogen Chloride | EPA524.2m |

TABLE 3

Exemplary contaminants for system verification

| | | MCLG[1] | |
|---|---|---:|---|
| 1 | Metals & Inorganics | | |
| | Asbestos | <7 | MFL[2] |
| | Free Cyanide | <0.2 | ppm |
| | Metals—Al, Sb, Be, B, Fe, Mn, Mo, Ni, Ag, Tl, V, Zn | 0.0005 | ppm |
| | Anions—NO$_3$—N, NO$_2$—N, Cl, SO$_4$, Total Nitrate/Nitrite | <1 | ppm |
| | Turbidity | <0.3 | NTU |
| 2 | Organics | | |
| | Volatile Organics—VOASDWA list + Nitrobenzene | | |
| | EDB & DBCP | 0 | ppm |
| | Semivolatile Organics—ML525 list + EPTC | <0.001 | ppm |
| | Pesticides and PCBs | <0.2 | ppb |
| | Herbicides—Regulated/Unregulated compounds | <0.007 | ppm |
| | Glyphosate | <0.7 | ppm |
| | Diquat | <0.02 | ppm |
| | Dioxin | 0 | ppm |
| 3 | Radiologicals | | |
| | Gross Alpha & Beta | <5 | pCi/l[3] |
| | Radium 226 | 0 | pCi/l[3] |
| | Uranium | <3 | ppb |
| 4 | Disinfection By-Products | | |
| | Chloramines | 4 | ppm |
| | Cyanogen Chloride | 0.1 | ppm |
| 5 | Biologicals | | |
| | *Cryptosporidium* | 0[4] | |
| | *Giardia lamblia* | 0[4] | |
| | Total coliforms | 0[4] | |

[1]MCLG = maximum concentration limit guidance
[2]MFL = million fibers per liter
[3]pCi/l = pico Curies per liter
[4]Substantially no detectable biological contaminants In preferred embodiments, the inlet switch is a solenoid activated (opened) when a signal is received indicating that the system is capable of receiving additional water for the purification process. Such feedback of demand for more inlet water can come from various points within the system including, for example, water level in the evaporation chamber (e.g., boiler), water level in the product storage tank, temperature of preheated water entering the degasser, temperature or volume of steam leaving the evaporation chamber, and the like. Likewise, various alternatives to a solenoid type of switch are available to those of skill in the art, such as, for example, a valve, an aperture, a peristaltic style tube compression mechanism and closure, piezoelectric switching, and the like.

In connection with the flow controller, optionally the flow controller can moderate water flow into the system by varying pressure, and such pressure variations can be signaled by detection within the system of greater demand for inlet water, and the like. This variable control of flow, rather than binary control of flow, can permit capturing certain efficiencies in the system.

Other controls and feedback points can provide further benefit in the automated function of the system including, for example, detection of water quality at any point in the system, detection of volume of water or steam at any point in the system, detection of leaks or temperatures that are indicative of a system malfunction, and the like. Embodiments of the system contemplate all such controls and combinations of controls. These include, for example, controls detecting flooding, storage tank capacity, evaporation chamber capacity, and the like. In various embodiments, feedback can be qualitative and/or quantitative. These can include, for example, the amount of water in a product water container, flow of product water through the product outlet, time of water flow, time of no water flow, amount of water in the evaporation chamber, detection of a leak, evaporation chamber pressure, output water quality (such as, for example, a measure of total dissolved solids), pressure differential across the evaporation chamber or across other points in the system, flow of water across an evaporation chamber overflow weir float, and the like.

Once power is supplied and the system is turned on, the system is configured for fully automatic control essentially throughout the life of the system. The system includes various feedback mechanisms to avoid flooding and to regulate water flow, pressure, output, and cleaning cycles, such that user intervention under normal circumstances is not required. Among these controls are a float level detector in the evaporation chamber (e.g., boiler), a side float switch, a timer, a fan switch, and a power meter.

Shut down controls include a manual control, a flood control which can be a float or a moisture detector in the base of the system adjacent the holding tank, a tank capacity control and an evaporation chamber capacity control. In addition to controls that provide binary, on/off, switching of inlet water or other parameters, the system further contemplates variable controls such as, for example, pressure- or volume-based flow controls, pressure regulators, and the like. In preferred embodiments, a pressure regulator can regulate inlet water pressure so that it is between 0 and 250 kPa, for example. In other embodiments, the pressure can be 10, 20, 30, 40, 50, 75, 100, 125, 150, 175, 200, 225, 275, 300, 350, 400, 450, or 500 kPa, or more. Regulation of pressure, optionally in combination with regulation of other parameters, can attenuate volume and velocity of water flow in the system. For example, pressure regulation in combination with the dimensions of the system can provide water flow rates of between 5 and 1000 ml/min, or more. Although the systems described herein are primarily described in terms of relatively small scale water production, the system is scalable to any volume of water production. Accordingly there is no upper limit to the volume of water flow. Exemplary flow rates, however, include ranges of 10 to 500 ml/min, 20 to 400 ml/min, 30 to 300 ml/min, 40 to 200 ml/min, 50 to 150 ml/min, 60 to 125 ml/min, 70 to 100 ml/min, 80 to 90 ml/min, and the like.

The system can further include a sediment trap capable of removing sediments from inlet water, so as to avoid premature fouling of the system with such sediments. Various sorts of sediment traps are known in the art, and can be selected for use with the systems of the invention. Likewise, to minimize user intervention and need for cleaning, a sediment trap can itself have self-cleaning features. For example, a sediment trap can have revolving screens, wherein rotation from a fouled screen to a new screen can be driven by a water pressure differential across the device, such that when a screen reaches a certain saturation point in terms of accumulated sediments, it is switched for a screen that is not fouled by sediments. In some embodiments, a fouled screen can be placed into a flow path of water such that water flows across the screen in an opposite direction from that of the original flow across the screen, thus dislodging sediments to a waste pathway or drain. Accordingly the systems disclosed herein contemplate use of conventional as well as self-cleaning sediment traps.

The preheat function of the water purification system preferably involves a preheat tube. However, this function can be performed in numerous different ways, provided that the result is that water flowing into the system arrives at the degasser at a temperature of about 90° C. or more. Accordingly, the preheat function can be embodied in numerous different forms, including, for example, a cylindrical tube, a spiral, a flattened plate or ramified network, a hollow structure of any sort with a design permitting a high ratio of surface area to internal volume, a lumen that is coaxial with a larger or smaller lumen permitting heat exchange across a wall between the lumens, and the like.

In preferred embodiments, the preheat tube passes adjacent to or through the evaporation chamber, and is configured such that the flow rate of inlet water through the preheat tube permits a range of residence time in or near the evaporation chamber sufficient to elevate the temperature of the water in the preheat tube to about 90° C. or more. Depending upon the scale of the system, and the capacity of the system for throughput of water, the preheat function can benefit from materials and configurations that permit efficient heat exchange. Alternatively, in some embodiments, durability of construction, space considerations, ease of maintenance, availability or expense of materials, as well as other considerations can affect the design choices in this aspect of the invention.

In preferred embodiments, the preheat function is a tube of stainless steel, which possesses beneficial properties of durability despite its relatively low heat conductivity. In such embodiments, the stainless steel tube is provided with wall thickness, internal diameter and other properties so as to enhance efficiency of heat exchange between the source of heat and the water inside the tube. In particularly preferred embodiments, the preheat tube is a coil that passes through the evaporation chamber (which, for example, is part of a boiler). Preferably, the orientation of the coil is horizontal: water entering the coil and leaving the coil is roughly at the same elevation within the evaporation chamber, and water passing through the coil undergoes a series of upward and then downward movements within the coil which favors mixing of the water with bubbles and avoids coalescence of large bubbles. Such coalescence of large bubbles is generally undesirable to the extent that large bubbles can interfere with normal flow of water through the preheater and into the degasser and/or can interfere with normal function of the degasser. However, in certain embodiments, a degasser function is sufficiently robust to tolerate large volumes of steam coming from inlet water and in such embodiments the design of the preheat function need not be particularly concerned with avoiding such coalescence.

In some embodiments, the system can beneficially function under nonstandard environmental conditions such as, for example, high altitude. At high altitudes, the boiling point of water is less than 100° C., and thus with normal rates of application of heat to the evaporation chamber will generate a greater amount of steam and will permit a higher quantitative throughput in the system. In such embodiments, it is evident that preheat temperatures may also be affected. Given lower evaporation chamber temperatures, preheating to a desired temperature can be achieved by permitting longer residence time of water in the preheat tube such as, for example, by configuring the tube to have a greater volume with an identical flow rate, or a lower flow rate with an identical volume. However, due to elevated levels of steam generation in the evaporation chamber, in most embodiments, adjusting downward the flow rate in the preheat tube to achieve beneficial residence times and desirable preheat temperatures, would be disfavored. This is because the greater rate of steam generation implies a concomitant higher demand for inlet water.

In embodiments in which the preheat tube is coaxial with another tube, heat exchange between any high heat portion of the system and the low heat inlet water can occur. Such heat exchange can be determined by the structure of the region of coaxiality and can be affected significantly by such factors as wall thickness composition of the heat exchange material, and the like. In preferred embodiments, steam condensation is achieved through heat exchange with inlet water, permitting excess heat from waste steam or product steam to transfer to lower temperature inlet water, aiding in the preheat function and in some cases permitting a shorter residence time in the evaporation chamber and/or a higher total flow rate of water through the system. In addition, a further benefit of such heat exchange is increased energy efficiency and less excess heat leaving the system into the surrounding environment. Alternatives to the coaxial arrangements include any conventional confirmations of heat exchange capability, such as, for example, adjacent flat plates; ultimately, any confirmation placing high temperature water or steam adjacent to low-temperature water that permits transfer of the energy from the high temperature water to the low temperature can achieve the heat exchange effect and is contemplated as an embodiment of the present invention.

A key factor in degasser performance is mass transfer ratio: the mass of water going downward in a vertical degasser as compared to the mass of steam going upward. Indeed, degassing function can be accomplished with various configurations that permit mass-transfer counterflow of water with a gas. In some embodiments, the gas is steam; in others the gas can be air, nitrogen, and the like. The velocity and activity of mixing of water with steam is affected by the size, conformation, and packing of the degasser column medium, as well as the void volume between the particles of the medium. In preferred embodiments, the particles of the medium pack to form a spiral. The performance of the degasser is affected by the velocity and volume of steam and water passing therethrough; these can be controlled by such factors as the size of the steam inlet and outlet orifice, water flow rate, and the like. Useful information relating to degasser function and design is provided in Williams, Robert *The Geometrical Foundation of Natural Structure: A Source Book of Design*, New York: Dover, 1979, which is incorporated herein by reference in its entirety.

Control of inlet water flow rate, avoidance of large steam bubbles in the preheat tube, and the like, can therefore aid efficient function of the degasser. When these parameters are not within a desirable range, flooding or jetting can occur in the degasser. Flooding of inlet water forms a water plug in the degasser and jetting shoots water out of the degasser with the steam, either of which can interfere with degasser performance. It is therefore desirable to operate in a zone that minimizes flooding and jetting and that has a good balance between water influx and steam efflux. The degasser of embodiments of the present invention is particularly important in that it is not designed to remove strictly one contaminant as many conventional degassers are. Instead it removes a variety of contaminants very effectively. In typical settings, where the inlet water has a contaminant at, for example, 1 ppm the process seeks to achieve reduction to 50, 40, 10, 5, 2, or 1 ppb.

The evaporation chamber can be of essentially any size and configuration depending upon the desired throughput of the system and other design choices made based upon the factors effecting system design. For example, the evaporation chamber can have a volume capacity of about 1 gallon or 2-10 gallons, 11-100 gallons, 101-1000 gallons, or more. Because the system of the invention is completely scalable, the size of the evaporation chamber is variable and can be selected as desired. Likewise, the configuration of the evaporation chamber can be varied as desired. For example, the evaporation chamber can be cylindrical, spherical, rectangular, or any other shape.

In preferred embodiments, a lower portion of the evaporation chamber is stepped to have a smaller cross-sectional area than the upper section of the chamber. Above the step is preferably a drain, such that upon draining, residual water remains below the step. The portion of the evaporation chamber below the step can also accommodate a cleaning medium such that after drainage all cleaning medium and some residual water is held in the lower portion. The benefit of the lower portion is that after rapid drainage of the evaporation chamber, heat can again be applied to the evaporation chamber, permitting rapid generation of steam prior to arrival of the first new inlet water into the evaporation chamber. This initial generation of steam permits steam flow through the degasser to achieve a steady state when a new cycle begins, which is beneficial to efficiently degassing of the inlet water. Likewise, a residual amount of water in the evaporation chamber avoids dry heating of the evaporation chamber which can be detrimental to the durability and stability of the chamber itself as well as the self-cleaning medium.

In some embodiments, the evaporation chamber drains by gravity only, in other embodiments draining the evaporation chamber is driven by pumping action. It is desirable that the evaporation chamber drain rapidly, to avoid the settling of sediments, salts, and other particulates. Rapid draining is preferably on the order of less than 30 seconds, although draining that is less rapid can still achieve substantially the desired benefits of avoiding settling and so on.

The self-cleaning medium can be selected from any of a number of suitable alternatives. Such alternatives include glass or ceramic beads or balls, stones, synthetic structures of any of a variety of shapes, and the like. In every case, the properties of the self-cleaning medium will be selected such that agitation by boiling water will displace individual particles of the self-cleaning medium, but that such displacement will be overcome by the physical properties of the self-cleaning medium causing each particle to fall again to the bottom of the evaporation chamber, striking it, to dislodge any deposits or scale. For example, a self-cleaning medium with a relatively high specific gravity but with a relatively small surface to volume ratio may function in a way that is roughly comparable to a second self-cleaning medium with a lower specific gravity but a relatively higher surface to volume ratio. In each case, a skilled artisan is able to select the combination of morphology, and composition to achieve the desired result. In some embodiments, an alternative approach to self-cleaning is employed, such as, for example, application of ultrasonic energy.

Another consideration in the design choice of the self-cleaning medium is the hardness thereof. In general, the hardness should be roughly comparable to the hardness of the material of which the evaporation chamber is composed. This permits continued use of the self-cleaning medium over long periods of time without significant erosion of the medium or of the walls or bottom of the evaporation chamber. In some embodiments, in which the heating element of the evaporation chamber is internal to the chamber, hardness and other properties of the self-cleaning medium can be selected so as to avoid erosion and/or other damage to the heating element as well as to the evaporation chamber itself.

Because of the self-cleaning function provided by the structure of the evaporation chamber and the evaporation chamber cleaning medium, the system of embodiments of the invention does not require cleaning during its normal life span of use. In some embodiments no cleaning is required for 2, 3, 4, 5 or 6 months. In other embodiments, no cleaning is required for 9, 12, 18, 24, 30, or 36 months. In other embodiments, no cleaning is required for 4, 5, 6, 7, 8, 9, 10 years, or more.

The heating element can be positioned in either within the evaporation chamber, just below the evaporation chamber, or can be integral therewith. For example, in preferred embodiments, the heating element is positioned just below the bottom of the evaporation chamber and is bonded to the evaporation chamber bottom by brazing, for example. The attachment method of the heater to the evaporation chamber can affect the cleaning and agitation of the self-cleaning medium, and the efficiency of the system. Brazing, roughly comparable to soldering, is a process that forms an alloy wedding to dissimilar metals, permitting a very close contact and heat transfer from the heating element to the evaporation chamber. In preferred embodiments, the heating element and the bottom of the evaporation chamber form a horizontal plate which is preferably for heat transfer to the water and also preferable for the self-cleaning function.

The residence time of water in the evaporation chamber can vary within a range based upon the nature of the inlet water and the desired performance of the system. The suitable range is determined by various factors, including whether biological contaminants are in the input water. Effective removal of biological contaminants can require a variable amount of time being exposed to the high temperatures in the evaporation chamber. Some biological contaminants are more quickly susceptible to high heat than are others. In many embodiments, a residence time as short as 10 minutes is sufficient to kill most biological contaminants. In other embodiments, longer residence times may be desired in order to more thoroughly eliminate a broader spectrum of biological contaminants. The upper end of the range of residence time in the evaporation chamber is typically dictated by efficiency considerations relating to the desired rate of generation of product water in comparison with the energy required to maintain a selected volume of water at boiling temperature. Accordingly, residence time in the evaporation chamber can be as little as the minimal time required for water to reach boiling point and evolve as steam, to time points beneficial to removal of biological contaminants such as, for example, 10, 15, 20, 25, 30, 35, 40, 45 minutes and the like and so on. Further, higher residence times such as, for example, 50, 60, 70, 80 and 90 minutes, or more, may be selected in some embodiments.

Steam exiting the evaporation chamber is generally free of particulates, sediments, and other contaminants. However, boiling action can cause certain contaminants to be carried into the vapor phase, for example on the surface of microdroplets of mist formed at the air/water interface. Clean steam can be separated from such contaminant-laden mist with use of a demister. Various kinds of demisters are known in the known in the art, including those employing screens, baffles, and the like, to separate steam from mist based upon size and mobility. Preferred demisters are those that employ cyclonic action to separate steam from mist based upon differential density. Cyclones work on the principle of moving a fluid or gas at high velocities in a radial motion, exerting centrifugal force on the components of the fluid or gas. Conventional cyclones have a conical section that in some cases can aid in the angular acceleration. However, in preferred embodiments, the cyclone demisters employed in the system do not have a conical section, but are instead essentially flat. Key parameters controlling the efficiency of the cyclone separation are the size of the steam inlet, the size of the two outlets, for clean steam and for contaminant-laden mist, and the pressure differential between the entry point and the outlet points.

The demister is typically positioned within or above the evaporation chamber, permitting steam from the chamber to enter the demister through an inlet orifice. Steam entering a demister through such an orifice has an initial velocity that is primarily a function of the pressure differential between the evaporation chamber and the demister, and the configuration of the orifice. Typically, the pressure differential across the demister is about 0.5 to 10 column inches of water—about 125 to 2500 Pa. The inlet orifice is generally designed to not provide significant resistance to entry of steam into the cyclone. Steam then can be further accelerated by its passing through an acceleration orifice that is, for example, significantly narrower than the inlet orifice. At high velocities, the clean steam, relatively much less dense than the mist, migrates toward the center of the cyclone, while the mist moves toward the periphery. A clean steam outlet positioned in the center of the cyclone provides an exit point for the clean steam, while a mist outlet positioned near the periphery of the cyclone permits efflux of mist from the demister. Clean stem passes from the demister to a condenser, while mist is directed to waste. In typical operation, clean steam to mist ratios are at least about 2:1; more commonly 3:1, 4:1, 5:1, or 6:1; preferably 7:1, 8:1, 9:1, or 10:1, and most preferably greater than 10:1. Demister selectivity can be adjusted based upon several factors including, for example, position and size of the clean steam exit opening, pressure differential across the demister, configuration and dimensions of the demister, and the like. Further information regarding demister design is provided in U.S. Provisional Patent Application No. 60/697,107 entitled, IMPROVED CYCLONE DEMISTER, filed Jul. 6, 2005, which is incorporated herein by reference in its entirety. The demisters disclosed herein are extremely efficient in removal of submicron-level contaminants. In contrast, demisters of other designs such as, for example, screen-type and baffle-type demisters, are much less effective at removing submicron-level contaminants.

Product and waste steam is typically condensed in the system. Excess heat can be exhausted by a heat sink, a fan, a heat exchanger, or a heat pipe. A discussion of heat pipes for transferring heat from condensing steam to inlet water is provided in U.S. Provisional Patent Application No. 60/727, 106 entitled, ENERGY-EFFICIENT DISTILLATION SYSTEM, filed Oct. 14, 2005, which is incorporated herein by reference in its entirety.

Product steam condensed to purified water is channeled to a product outlet or a storage tank, for example. Storage tanks can be of any suitable composition that resists corrosion and oxidation. Preferred compositions for storage tanks include stainless steel, plastics including polypropylene, and the like. In some embodiments, the storage tank includes controls to avoid overflow and/or detect water level. Such controls can attenuate flow of inlet water and/or other functions of the system such that production of product water is responsive to demand therefore. Although product water entering the storage tank is extremely clean and essentially sterile, it can be desirable to provide an optional cleaning/sterilization function in the storage tank, in case an external contaminant enters the tank and compromises the cleanliness thereof.

Within the storage tank can be various controls for feedback to the overall control system. In preferred embodiments, these controls can include a float switch for feedback to control the flow of inlet water, and a conductivity meter to detect dissolved solids in the product water. In typical operation, dissolved solids in the product water will be exceedingly low. However, if a contaminant were to be deposited into the storage tank, such as for example by a rodent or insect, the resulting contamination would increase the conductivity of the water. The conductivity meter can detect such an elevation of conductivity and provide an indication that it may be advisable to initiate a steam-sterilization cycle of the storage tank. The control system can have the capability of draining the water from the storage tank, sending a continuous supply of steam into the storage tank to clean and sterilize it, and then re-start a water purification cycle. These operations can be manually controlled or automatically controlled, in various embodiments of the invention.

Water can be delivered from the storage tank to an outlet, such as a faucet, and such delivery can be mediated by gravity and/or by a pump. In preferred embodiments, the pump is an on-demand pump that maintains a constant pressure at the outlet, so that water flow from the outlet is substantial and consistent. The outlet pump can be controlled by a sensor in the storage tank to avoid dry running of the pump if the water level in the tank is below a critical level.

Exemplary Water Purification System

The following discussion makes reference to structural features of an exemplary water purification system according to embodiments of the invention. Reference numerals correspond to those depicted in FIGS. 1-6.

In operation the purification system 10 includes an inlet port 20 which connects to an inlet water tube 22, through which water passes from the inlet port 20 to an inlet switch 24. The inlet switch 24 can be controlled by one or more of various possible feedback sources from the control system. In the depicted embodiment, the switch 24 is a solenoid that can be open or shut based upon feedback from the control system 120, primarily based upon feedback of the level of water in the evaporation chamber 50. The inlet switch 24 includes a sediment trap 25 to avoid fouling the system 10 with sediments. Adjacent the inlet switch 24 is a flow regulator 26. The flow regulator 26 regulates flow by controlling the water pressure, generally maintaining water pressure between 0 and 250 kPa.

Water exits the flow regulator 26, to a preheater feed tube 28, which delivers water to the preheater 30. Optionally, a pre-filter can be positioned at one or more places between the inlet port 20, the switch 24, and the inlet water tube 22, flow regulator 26, and the preheat feed tube 28. Water enters the preheater 30 at an inlet 32, passes through a coil 34, and leaves the preheater at an outlet 36. The coil 34 is oriented such that net flow of water through the coil 34 is in a substantially horizontal orientation, while the actual pathway of water through the coil 34 involves multiple passages through the horizontal plane including upward and downward flow of water through the coil 34 as well as horizontal water flow at the top and bottom of each turn of the coil 34. It is believed that passing hot water through a coil oriented in this way permits preheating of water while maintaining a desirable mixing of the water which can avoid formation of large gas or vapor bubbles. In preferred embodiments, the preheater is substantially positioned within the evaporation chamber 50 (for example, a boiler), and preferably is in close proximity with the portion of the evaporation chamber that is in contact with the heating element 56.

Water leaving the preheater 30 at the outlet 36, enters the preheated water tube 38 and passes therethrough to arrive at the degasser 40. Upon departure of water from the preheater 30, water is at least about 96° C., preferably about 97, 98, or 99° C., or more. Preferably the degasser 30 is in a substantially vertical orientation. By substantially vertical is meant in preferred embodiments within 0 to 5 degrees of divergence from plumb, or true vertical. In other embodiments, substantially vertical can mean divergence of about 5 to 20 degrees. In other embodiments, substantially vertical can mean divergence of about 20 to 45 degrees. The configuration of the degasser 40 is generally cylindrical, preferably with a greater height than diameter. Accordingly, preheated water enters the degasser 40 adjacent the degasser top 42 and exits the degasser 40 adjacent the degasser bottom 44, thus entering the evaporation chamber 50. By adjacent is meant at or near; thus, for example, a water entry point "adjacent" the top 42 can indicate entry of water directly at or through the top 42 or can indicate entry of water in a region of the degasser 40 that is substantially closer to the top 42 than to the bottom 44.

The pathway of water downward through the vertically oriented degasser 40 places the water into a flow pattern in intimate contact with the degasser medium 45. In preferred embodiments, the degasser medium includes spherical particles. The spherical particles are preferably glass. In alternative embodiments, the particles can be of different composition and/or can be non-spherical and/or irregular in shape. A more detailed discussion of various degasser improvements and configurations is provided herein under the section heading DEGASSER APPARATUS, below.

Steam from the evaporation chamber 50 enters the degasser 40 adjacent the bottom 44 and rises vertically in contact with the medium 45 to exit the degasser adjacent the top 42 through a degasser steam outlet 46. Water flowing downward through the degasser 40 encounters steam rising upward through the degasser medium 45 and is stripped of essentially all gasses and organics. The significantly nonlinear counterflow of preheated water downward and steam upward thorough the degasser medium 45 facilitates removal of volatile compounds and substantially all compounds in gaseous form. Advantageously and unexpectedly, this degasser 40 configuration and function also permits removal of organic contaminants in the water that otherwise would be extremely difficult to remove. For example, the system permits removal of isopropyl alcohol from water; isopropyl alcohol is a particularly difficult contaminant for most systems to remove, because of the similarities of its properties with those of water.

Steam leaving the degasser 40 through the steam outlet 46 enters a waste condenser 48 where it condenses and flows to waste. In an alternative embodiment, all or part of the waste condenser 48 function is performed by heat exchange with any portion of the inlet tube 22, the preheater feed tube 28, or the preheater 30, with the effect that heat from the degasser waste steam is exchanged to preheat the inlet water. This heat exchange has the dual benefit of exhausting excess heat from the system 10 such that this heat is not radiated to the local environment of the system 10, as well as adding an increment of efficiency by providing energy for preheating inlet water prior to degassing. The heat exchange configuration can include various approaches to heat exchange. In some preferred embodiments, heat exchange is accomplished by coaxial orientation of a waste steam tube and a preheat tube.

Degassed water drains adjacent the bottom 44 of the degasser 40 into the evaporation chamber 50. The evaporation chamber 50 preferably includes at least two segments, an upper segment 52 and a lower segment 53. The segments are joined at a segment junction 54. In preferred embodiments, the evaporation chamber 50 is generally cylindrical, the upper segment 52 having a larger diameter than the lower segment 53. In some embodiments the segment junction 54 is substantially horizontal while in others it can have a sloping orientation. At the bottom 55 of the lower segment 53, and in close contact therewith, is an evaporation chamber heating element 56. Positioned at or near the junction 54 is an evaporation chamber drain 60.

Also contained within the evaporation chamber 50 is an evaporation chamber cleaning medium 58. In preferred embodiments the evaporation chamber cleaning medium 58 is a population of ceramic particles 59, substantially spherical in shape. The particles 59 have a size and density selected to permit the particles 59 to remain near the bottom 55 of the evaporation chamber 50 despite agitation by boiling water, while having properties, such as size and density, so that boiling action agitates the particles 59. Likewise, evaporation chamber particles 59 also preferably have a hardness that permits prolonged abrasion of the bottom 55 without deleterious degradation of the particles 59 or the bottom 55. In operation, the boiling action agitates the particles 59, raising them into the boiling water. When a particle 59 is agitated and elevated by boiling action, it later drops, striking the bottom of the evaporation chamber. This continual rising, falling, and striking action scours the bottom 55 of the evaporation chamber 50 and prevents buildup of scale or other deposits.

Positioned at or above the evaporation chamber segment junction 54 is an evaporation chamber drain 60. It is preferred to position the evaporation chamber drain 60 at or above the junction 54 so that upon draining the evaporation chamber 50 in a cleaning cycle, water drains from the upper segment 52 but not from the lower segment 53. After a draining cycle, the lower segment 53 contains the evaporation chamber cleaning medium 58 and evaporation chamber water. This provides sufficient water to permit generation of steam essentially immediately upon initiation of another cycle, which steam can rise and enter the degasser 40. The configuration of the evaporation chamber drain 60 is preferably of sufficient internal dimensions to permit very rapid draining of the evaporation chamber 50, which avoids settling of sediments. Further, the evaporation chamber drain 60 preferably has an opening that is configured so as not to be complementary with the shape of the particles 59 of the evaporation chamber cleaning medium 58. This designed non-complementarity prevents an evaporation chamber cleaning particle 59 from articulating with the evaporation chamber drain 60 and interfering with proper drainage.

Flow of water into the evaporation chamber 50 and/or evaporation chamber volume are selected such that water in the evaporation chamber 50 has an average residence time of approximately 45 minutes. Such residence time exceeds commonly accepted times for sterilization by boiling, thus killing any biological contaminants in the water. The evaporation chamber 50 further includes an evaporation chamber cover 61. An evaporation chamber steam outlet 62 in the evaporation chamber cover 61 permits steam to exit the evaporation chamber 50 and enter the demister 70. Steam leaving the evaporation chamber into the demister is substantially free of gasses, volatiles and organics—having passed through the degasser 40—and likewise is substantially free of sediments, particulates, biologicals, minerals, and the like, given that substantially all such contaminants remain in liquid water in the evaporation chamber 50, rather than in the steam leaving the evaporation chamber 50. However, such steam can contain small contaminants that are carried into the vapor phase by the boiling action. Thus, steam leaving the evaporation chamber 50 into the demister 70 requires separation into clean steam and contaminant-containing mist.

The demister 70 operates on a cyclone principle. Steam enters the demister 70 via a demister inlet chamber 72. Steam flows from the demister inlet chamber 72, through a demister orifice 74, and into a demister cyclone cavity 75. The cyclone cavity 75 is substantially cylindrical, and the shape and orientation of the demister orifice 74 is selected so as to direct steam entering the orifice 74 to the periphery of the cyclone cavity 75 at a high velocity, thus creating a cyclone effect. Rotation of the steam at high velocity about the axis of the cyclone cavity 75 permits separation based upon density differences of clean steam and contaminated mist. Clean steam, being less dense, is driven toward the center of the cyclone cavity 75, and exits the cyclone cavity 75 through a demister clean steam outlet 76. Clean steam exiting the outlet 76 flows into a clean steam outlet tube 78, while contaminated mist exits the cyclone cavity 75 through a demister waste outlet 80. A more detailed description of the DEMISTER is provided below.

Clean stem flows from the outlet tube 78 into a product condenser 90. The product condenser, in preferred embodiments, includes coiled tubing having dimensions and composition selected to permit efficient exchange of heat. A condenser fan 94 cools the product condenser coil 90 and the waste condenser coil 48. Condensed clean steam forms product water and is directed to a storage tank 100 via a product tube 96. Positioned along the product tube 96 is a three-way valve 98. In operation, three-way valve 98 can direct product water toward waste or toward the storage tank 100.

In a typical purification cycle, during an initial period of evaporation chamber 50 warm-up and filling—prior to full functioning of the preheating and degassing functions of the system—the first several minutes of a new cycle involve increasing temperatures in the preheater 30 and the degasser 40. Eventually the system attains preheat temperatures and steam volumes that permit effective degassing. Thus, during warm up in a purification cycle, prior to fully effective degassing, steam exiting the evaporation chamber 50 can be contaminated with residual volatiles and organics. In order to avoid these contaminants entering the storage tank 100, steam entering the demister clean steam outlet tube 78, and condensing into water in the product condenser 90, during the first 20 minutes of the cycle, is shunted by the three-way valve 98 to waste. After 20 minutes of system warm-up, the preheater 30 and degasser 40 are fully functional, the clean steam leaving the demister is substantially free of volatiles and organics, and the three-way valve switches to permit collection of product water into the storage tank 100. When water is not being withdrawn from the storage tank 100, the system can cycle in about 24 hours from initial startup, through tank fill-up. If water is being consumed, the system can produce about 2.5 gallons in about 10 hours. The storage tank 100 has a volume of 6 useable gallons. Although user intervention and cleaning is not required, the system does provide for the user to select a steam sterilization cycle in the collection tank 100 if and when such cleaning is desired.

The system further includes a product pump 102 which maintains a substantially constant pressure of product water at the outlet port 104. A user interface panel 110 includes an LED showing on/off status of the system as well as various optional manual controls if desired.

Control Circuitry

Figure 7:
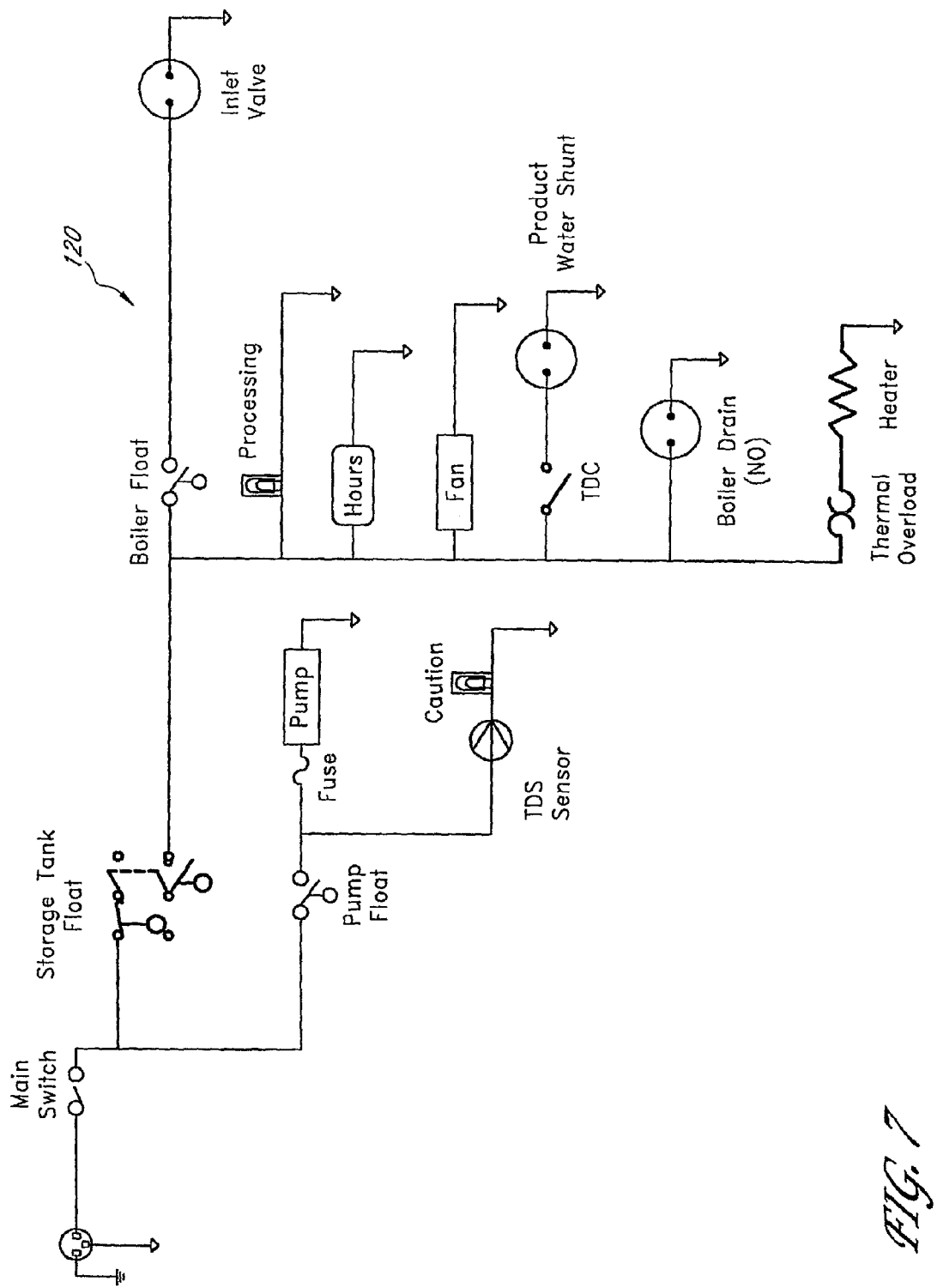
FIG. 7 is a diagram of the control circuitry of an embodiment of the water purification system.

This discussion is aided by reference to FIG. 7. When the main power switch is energized, the control circuitry determines the water level status in the holding tank by means of a float switch within the tank. If the control system determines that there is a need to replenish water in the holding tank, it initiates the water purification sequence.

During the water purification cycle, the control circuitry closes the evaporation chamber drain valve, opens the inlet water valve, and energizes the "Processing" lamp, the evaporation chamber heating element, the hours counter, and the cooling fan. The control circuitry also monitors the water level in the evaporation chamber by means of a float switch, and adjusts the flow of incoming water as necessary. The flow adjustment is controlled by the inlet switch, solenoid that receives feedback from the float switch in the evaporation chamber. As a safety feature, the control circuitry also monitors the temperature of the heater and of the evaporation chamber and will interrupt power to the heater if necessary.

After a pre-determined interval, preferably 20 minutes, during which the system thermally stabilizes, the control circuitry automatically switches pure water output flow from the bypass mode to the holding tank. Once the control circuitry has determined that the holding tank is full, it shuts down the water purification sequence and initiates the self cleaning feature of the system.

The system's control circuitry continually monitors the status of the water in the holding tank for both quantity, via the float switch, and quality via conductivity, for example. If the quality of the water deteriorates, the control circuitry sends a signal to illuminate a caution light. If the quantity of water is low, the control circuitry automatically begins processing pure water to replenish the holding tank as described above.

The control circuitry also maintains a check on the water delivery pump, and will cut off power to the pump if there is an overload or if the water level in the tank is too low to deliver a reliable supply of pure water. Finally, the control circuitry will also monitor the system for water leakage via a float switch in a bottom pan housing the system. This switch is activated upon accumulation of an significant amount of water in the pan, in which case the control circuitry will shut the entire system down due to the leak.

Example 1

Removal of Nonvolatile or Volatile Organics in Degasser

As a demonstration of the effectiveness of the degasser in the described embodiment of the invention, a test was conducted with isopropyl alcohol in the input water. The system was permitted to charge to achieve full function of the degasser: the system was warmed up such that the preheat function was achieved and a steady state volume of steam was delivered from the evaporation chamber into the degasser. A sample of input water containing 4 ppm of isopropyl alcohol was introduced into the system and product water from such sample was then quantitatively tested for presence of isopropyl alcohol. A reduction of approximately 100× was noted: the concentration of isopropyl alcohol in the output water was about 40 ppb.

Example 2

Removal of Biological Contaminants

The total coliform group is relatively easy to culture in the lab, and therefore, has been selected as the primary indicator bacteria for the presence of disease causing organisms. Coliform bacteria are not pathogenic (disease causing) organisms, and are only mildly infectious. For this reason these bacteria are relatively safe to work with in the laboratory. If large numbers of coliforms are found in water, there is a high probability that other pathogenic bacteria or organisms, such as *Giardia* and *Cryptosporidium*, may be present. Public drinking water supplies are tested to demonstrate the absence of total coliform per 100 mls of drinking water. Approved tests for total coliform bacteria include the membrane filter, multiple tube fermentation, MPN and MMO-MUG ("Colilert") methods. The membrane filter method uses a fine porosity filter which can retain bacteria. The filter is placed in a petri (culture) dish on a pad with growth enrichment media (mEndo) and is incubated for 24 hrs at 35 degrees C. Individual bacteria cells which collect on the filter grow into dome-shaped colonies. The coliform bacteria have a gold-green sheen, and are counted directly from the dish. Since some other bacteria may develop a similar color, a confirmation test using more specific media is required. The confirmation procedure requires an additional 24 to 48 hrs to complete the test for suspected positive total coliform tests.

An inlet water sample is cultured to detect the presence of coliform bacteria. A 100 ml sample of water is cultured and coliform colonies are detected. The inlet water is treated in the system as described herein, and a corresponding test of 100 ml of product water is cultured. No coliform colonies are detected, indicating that the product water is free of biological contaminants.

Degasser Apparatus Detail and Alternatives

Degassing water is normally achieved by heating the incoming water to increase the vapor pressure of volatile compounds. At the boiling point of each compound, the solubility of the dissolved gas drops to zero and the gas will then exit the water. For example, many of the volatile substances found in drinking water are chlorinated compounds that normally have very large partial pressures at temperatures well below the boiling point of water. Thus, many of these substances can be removed from water by heating the water to temperatures of about 200-210° F. (93-99° C.) to effect proper degassing. However, the substances do not completely leave the water immediately; thus, it takes some period of time to completely remove the dissolved gases.

One difficulty with previous degasser designs, e.g., in water purification systems used for residential applications, is that they have little control of the residence time of the heated water in the degasser. Consequently, when excessive amounts of volatile substances are present in the incoming water, there may not be sufficient residence time provided to effect degassing of all the volatile substances. Additionally, many degassers operate in the absence of pressure controls, which can lead to excessive loss of water vapor, when water vapor is the medium selected for effecting mass transfer of the volatile components out of the system.

Another issue in degasser design is scalability. While large industrial degassers operate with substantial pressure drops and large volumes of both liquid and gases that are effective for mass transfer and, thus, degassing, small degassers do not scale down well and operating them at throughputs of less than 10 gallons per day has been a challenge.

What is needed is a more compact degasser that allows for additional residence time, that is also capable of limiting the amount of wasted steam in a system for point-of-use or point-of-entry.

In some embodiments, a degasser is provided, which has concentric layers of particles, where an inner layer of particles is configured to result in comparatively small spaces between the particles, and where an outer layer of particles is configured to result in comparatively larger spaces between the particles. In various embodiments, the particles exhibit random and structured packing in the degasser. The particles can be made of a material such as, metal, glass, and plastic. The degasser can have a water entrance at the top. The degasser can have a waste steam exit at the top, and have a heated steam entrance and water exit at the bottom.

In some embodiments, a degasser apparatus is provided that has a container that holds concentric layers of particles, where an inner layer of particles is configured to result in small spaces between the particles, where a middle layer of particles is configured to result in medium spaces between the particles, and where an outer layer of particles is configured to result in larger spaces between the particles. The medium spaces are such that water vapor in the system begins to condense out of the gas phase, and the small spaces are small enough that this process continues so that water vapor is transformed into liquid water.

In other embodiments, the degasser container has a steam entrance at the bottom outer periphery of the container. The steam entrance allows heating steam from a boiling chamber to enter the container at the outer periphery and heat the outer periphery of the inside of the degasser. The container has a steam exit at the top of the container where waste steam exits the system. The container has a water entrance at the top of the container. The container has a purified water exit at the bottom of the container. The water exit is located, for example, in the center bottom of the container. The container is filled with particles. There are, in some embodiments, three sizes of particles and each particle of a given size is located in a concentric zone; thus, in such embodiments, there are three concentric zones, each having a particle of a given size. In a preferred embodiment, the particles are glass beads. In a more preferred embodiment, there are three sizes of particles with the largest sized particle in an outermost zone of the container and the smallest sized particle in an innermost zone of the container. In a most preferred embodiment, there is an outermost zone or layer having 8 mm glass beads, a middle zone or layer having 6 mm glass beads, and a center zone or layer having 4 mm glass beads in the container. In some embodiments, the beads are made from soda/lime glass. In such embodiments, twenty 3 mm beads can weight about 0.7 grams, twenty 4 mm beads can weigh about 1.8 grams, twenty 6 mm beads can weigh about 5.7 grams and twenty 8 mm beads can weigh about 14.4 grams.

Some embodiments include a compact, more effective, degasser. The degasser preferably employs concentric layers of varying porosity so that a zone is created in the degasser that allows steam to pass and another zone is created that promotes water vapor condensation. The degasser includes particles inside the degasser that add surface area to the inside of the degasser, thereby allowing for a greater residence time for the water to be purified.

In some embodiments, the porosity of the system is achieved through differently sized particles. In these embodiments, the particles in the outer layer have a relatively large size so that heating steam can more readily pass from a source of steam, such as an evaporation chamber, into and throughout the degasser. This heating steam, coming from the evaporation chamber, can also act as an insulator to keep the inside temperature of the system near the boiling point. Inside the outer layer of larger sized particles is a layer of medium sized particles. This layer of medium sized particles provides for adequate permeability and long residence time, allowing for a higher percentage of the volatile substances to be degassed. This medium sized layer of pores and particles is more likely to condense water from the steam, as there is less space between the particles. The inner layer includes smaller sized particles, so that the pores are mostly filled with degassed water, which flows, by gravity, into the evaporation chamber.

Figure 8:
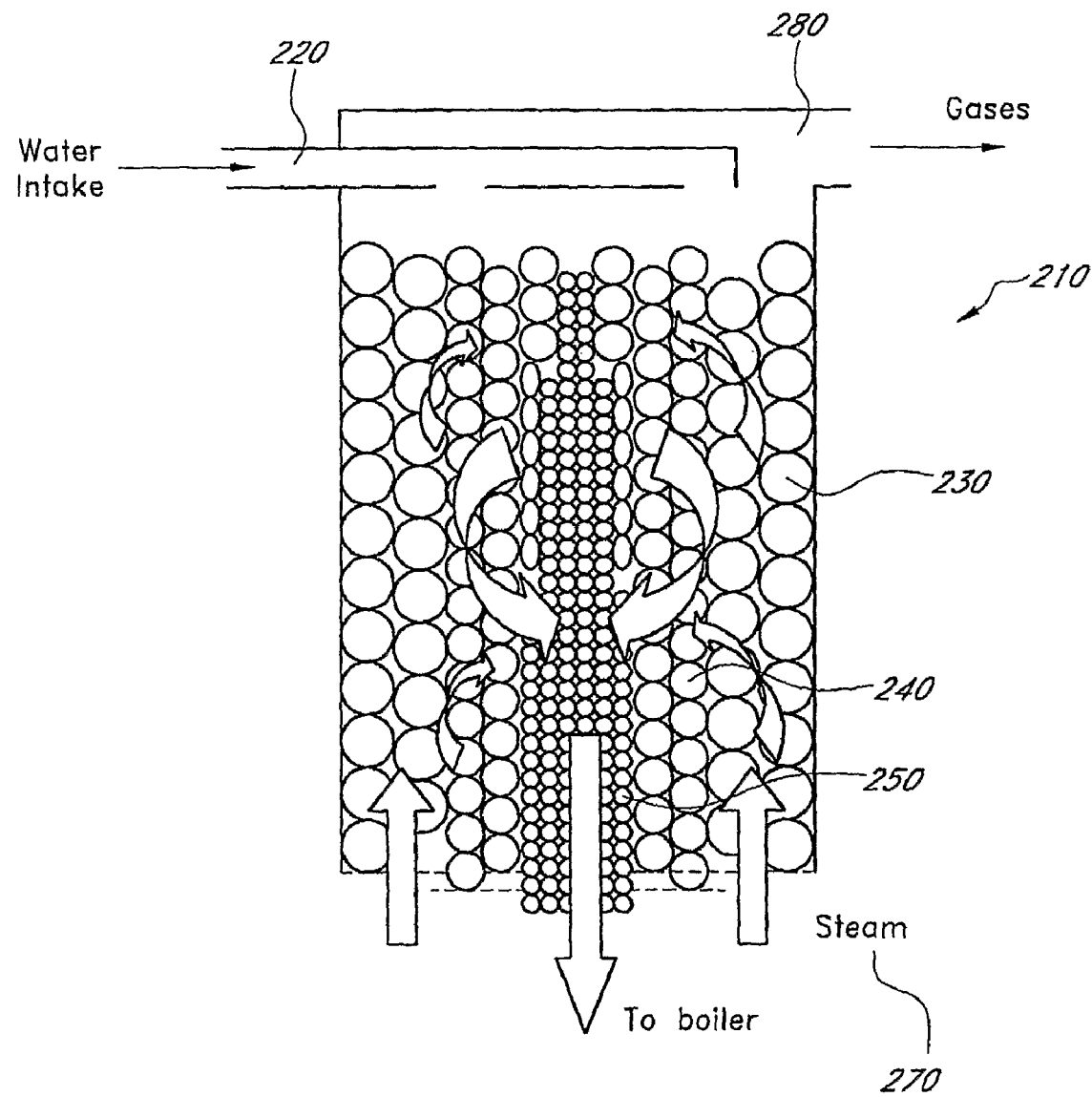
FIG. 8 is a cross-sectional diagram of an exemplary degasser apparatus.

FIG. 8 illustrates the concept of a typical degasser unit 210. In a preferred embodiment, incoming water or other liquid to be degassed flows in through the top of the degasser through the intake port 220. Preferably, the incoming water is warm or hot. The water can flow freely through the degasser, which is packed with a series of particles. Preferably, the particles are glass beads. The incoming water is further heated via steam in the degasser, from an evaporation chamber. The outer particles 230 are larger than the middle layer of particles 240, which are in turn larger than the inner layer of particles 250. The increased surface area of the beads toward the central axis of the degasser allows for a larger amount of a volatile gas to be stripped from the water. The larger particles provide for a zone 250 through which heated steam can be added to the degasser, rapidly and efficiently, while the medium and smaller sized particles provide zones 230 and 240 in the degasser where the stripped steam can condense into liquid form and drain out of the degasser, e.g., into an evaporation chamber apparatus, which is preferably located below the degasser. As will be appreciated by one of skill in the art, items 230, 240, and 250 can refer to either the particles themselves, or the zones of porosity, which in the depicted embodiments are created from the spaces between the particles.

Steam 270 is added to the degasser, primarily to add heat to the system. The various gases can exit the system through the exit port 280 which is preferably located at or near the top of the unit. As the section of the degasser that will result in the condensation of the steam back into water is the section with the smaller spaces between the particles, and as this section is in the center of the degasser, this arrangement can allow for steam to circulate and heat the outer section of the degasser, while the steam will condense in the center section of the degasser and drain into the next section. As will be appreciated by one of skill in the art, the position of the differently sized particles and the different zones can be altered. For example, in some embodiments, the smaller particles are positioned on the outer periphery of the degasser, the medium particles inward, and the larger particles in the center. Additionally, the medium sized can be positioned in the center or the outer periphery. In such embodiments, the positions of the steam inlet and outlet, and the outlet for degassed water, are preferably relocated accordingly. However, the preferred embodiment is depicted in FIG. 8.

The degasser system is preferably located in close proximity to the evaporation chamber apparatus. Preferably, the degasser unit is located on the top of an evaporation chamber. This allows steam from the evaporation chamber to rise directly from the evaporation chamber into the degasser. This also allows the degassed water from the degasser to drain straight into the evaporation chamber. As will be appreciated by one of skill in the art, there need not be any significant separation between the evaporation chamber and the degasser. In one embodiment, only a screen, to retain the particles, separates the degasser from the evaporation chamber.

The particles can be of any shape, for example, spherical, semi-spherical, amorphous, rectangular, oblong, square, rounded, polyhedral, irregular (such as gravel, for example), and the like. The particle surface can be varied as desired, such as, for example, solid, porous, semi-porous, coated, or structured to provide large residence time, and the like. Preferably, the particles are spherical and nonporous. One of skill in the art will appreciate that the differently sized particles will have differently sized spaces between them (interstitial spaces). For example, larger glass spheres will have larger spaces than smaller glass spheres. The size of the interparticle space can vary based on the size of the particles, the shape of the particles, and other factors. As a general rule, generally spherical particles that are larger will also result in a mixture with larger porosity. That is, there will be relatively large spaces between the spheres. Likewise, particles that are smaller will have smaller interstitial spaces, resulting in an environment that is more likely to condense steam into liquid water.

The particles can be made of any suitable material. Exemplary materials include but are not limited to metal, glass, composites, ceramics, plastics, stone, cellulosic materials, fibrous materials and the like. A mixture of materials can be used if desired. One of skill in the art will be able to determine a suitable material for each specific purpose. Preferably, the material is made of glass. The chosen material will preferable be capable of standing up to long term high temperature use without significant cracking, breaking, other damage, or leaching toxic materials into the water. If desired, the differently sized particles can be made of different materials. For example, the outer particles can be made of metal, the middle layer of temperature resistant plastic, and the center layer of glass. The chosen material can preferably be resistant to breakage, rust, or cracking due to the heating process.

One of skill in the art will appreciate that the particles can be chosen to be of any desired size. For example, the outer particles can have a diameter ranging from about 5 mm to about 25 mm, or greater. The middle layer of particles can have a diameter ranging, for example, about 1 mm, or less, to about 15 mm, or greater. The center layer of particles can have a diameter ranging, for example, from less than about 0.1 mm to about 10 mm, or greater. In general, the diameter can range from between about 0.1 mm to about 30 mm.

In a preferred embodiment, the concentric layers of particles are glass beads, having, for example, an outermost layer having 8 mm glass beads, a middle layer having 6 mm glass beads, and a center layer having 4 mm glass beads. The ratio of the diameter of the outer particles to the diameter of the inner particles can be varied as desired by one of skill in the art. The ratio of outer particle size to inner particle size can be, for example, from about 1.1 to 1,000:1.

Preferably, the particle layering is in concentric circles, with the smallest sized particles at the center of the unit, while the largest particles are closest to the outside wall of the unit. As will be appreciated by one of skill in the art, the circles need not be precise, and need not necessarily be concentric. For example, while nonconcentric circles will not necessarily have all of the benefits of the depicted embodiment, embodiments that have zones of large porosity that lead steam into zones of smaller porosity can function well and provide the major benefits of the invention. In some embodiments, the various zones or differently sized particles are kept in discrete groups through the use of a screen. In a preferred embodiment, the variously sized particles are kept in discrete groups by the way they are packed into the container, where the small particles are prevented from mixing with the larger particles by the presence of the medium sized particles.

If desired, more than 2 or 3 layers can be used. For example, 4, 5, 6, or 7 layers or more can be used. In a preferred embodiment, three layers are used, each of a different size. In some embodiments, rather than altering the size of the particles, other properties of the particles are altered, such as the surface properties of the particles. Further, if desired, the degasser can be packed with a mixture of differently sized particles, where the packing procedure is performed so as to allow a progressively smaller particle size to fill the center regions of the degasser. In some embodiments, the layers are packed with particles that are homogeneous throughout the layer. In other embodiments, the layers are heterogeneous and can contain other shaped beads, particles, glass wool, etc. Heterogeneity of the particles can include not only size but also, for example, composition, surface characteristics, density, specific heat, wettability (hydrophobicity versus hydrophilicity), hardness, ductility, and the like. Preferably, as discussed above, the heterogeneity in whatever form it takes is distributed in concentric rings within the degasser, although other arrangements that are not concentric are also contemplated in some embodiments of the invention.

The degasser apparatus walls and inlet/outlet ports can be made of any suitable material. Exemplary materials include, for example, metal, aluminum, glass, composite materials, temperature resistant polypropylene, and the like. Preferably, the wall material is made of rust-resistant steel. Preferably, the material will stand up to long term use with high temperatures without cracking, breaking, or leaching toxic materials into the water.

In some embodiments, the degasser is used for providing adequate residence time for degassing water, even if the water contains objectionable amounts of volatile substances. Thus, the degasser can be used to produce safer drinking water, or less toxic water for many other uses.

Examples of volatile contaminants that can be removed or lessened by treatment of water with the method of the present invention include but are not limited to, methyl tertiary butyl ether, benzene, carbon tetrachloride, chlorobenzene, o-dichlorobenzene, p-dichlorobenzene, 1,1-dichloroethylene, cis-1,2-dichloroethylene trans-1,2-dichoroethylene, dichloromethane, 1,2-dichloroethane, 1,2-dichloropropane, ethylbenzene, styrene, tetrachloroethylene, 1,2,4-trichlorobenzene, 1,1,1,-trichloroethane, 1,1,2-trichloroethane, trichloroethylene, toluene, vinyl chloride, xylenes, natural gases, such as oxygen, nitrogen, carbon dioxide, chlorine, bromine, fluorine, and hydrogen, other volatile organic compounds (VOCs), such as formic acid, ethyl hydrazine, methyl methacrylate, butyl ethyl amine, butanol, propanol, acetaldehyde, acetonitrile, butyl amine, ethyl amine, ethanol, methanol, acetone, allyl amine, allyl alcohol, methyl acetate, ammonium hydroxide, and ammonia, and the like.

In further embodiments of the invention, the outer section of the degasser can also provide for effective thermal insulation of the inner section of the degasser volume, so as to maintain the temperature of the incoming water near the boiling point of water. In some embodiments, the particles themselves are selected for their heat retaining ability. This can save energy and creates a more efficient degassing system.

In some embodiments, the degasser design of the present invention provides for a steady path to carry the degassed water into the evaporation chamber, while at the same time avoiding the need for excessive evolution of steam. This is because the steam heats the outer shell of the degasser and because it can readily enter the degasser in one zone, while a separate zone allows for the condensation and flow of degassed water out of the system. By preventing excess steam evolution, the problem of possible precipitation of salts into the particles can be avoided.

In some embodiments, the degasser can be more compact than currently used models, because the different particle sizes of the system can result in a high surface area. The height of the degasser can then be minimized, thus yielding a more compact design.

In some embodiments, the degasser is more efficient in removing impurities from a sample, as compared with conventional degassers. For example, in some embodiments, the degasser in FIG. 8 can remove 40 parts per million of chlorine from water at flow rates of up to 30 ml/minute. In some embodiments is can remove up to 2 ppm of ammonia in water at rates of up to 20 ml/minute. In some embodiments, it can remove common gases, such as air, up to their solubility limits, at rates of up to 30 ml/minute.

Degasser Examples

Example 3

Preparation of the Degasser Apparatus

A 1" wide by 12" tall stainless steel cylinder is fitted with a stainless steel water inlet port and a stainless steel gas/water outlet port, as shown in FIG. 8 (in alternative embodiments, a 1" wide by 8" tall, 1.5" wide by 8" tall, or 3.5" wide by 12" tall device can be used). The unit is attached to the top of an evaporation chamber apparatus. The cylinder is then filled with clean, spherical glass beads as follows. The outer region is packed with glass beads having a diameter of about 8 mm. The middle layer is then packed with beads having a diameter of about 6 mm. The central region is then packed with glass beads having a diameter of about 4 mm. The degasser is fitted with a stainless steel cover unit. The evaporation chamber is heated and steam is allowed to pass through the degasser. Once the degasser is warmed, water to be treated is preheated and then added to the top of the degasser. Water that leaves the degasser will have a reduced amount of volatile compound in it. When the device comes up to a stable temperature, it nearly completely removes gases from water containing the following concentrations: 40 ppm chlorine, 2 ppm ammonia, and most natural gases in air up to their solubility limits.

Example 4

Use of the Scale-Up Degasser Apparatus to Purify Drinking Water

The degasser apparatus of Example 3 is assembled on top of a 2 gallon evaporation chamber system. Water to be purified is then is pumped through the inlet of a preheated degasser at a rate of 5 ml/minute to 50 ml/minute. (In other embodiments, up to several liters/minute can be used). The water entering the degasser is preheated to a temperature of about 200° C. Water enters the degasser essentially at the boiling point of water. When large volumes of water are being processed, the temperature at the top of the degasser can drop a few degrees (down to 98° C.). Approximately 10 to 20% of the incoming water throughput is used as steam to drive the degasser, and about half of that is re-condensed in the degasser (although steam use can be reduced to less than 1% of the water throughput). The purified water descends into the evaporation chamber, is allowed to cool, and is sampled for levels of volatile contaminants. By use of this method, the volatile contaminants are removed, and the water is purified.

The unit can be operated continuously, so it can operate as long as there is a need to degas the water. The rate of drainage from the degasser depends on the packing and size of glass beads and varies from about one second to a few minutes.

Demister Details and Alternatives:

In one aspect of the invention, an adjustable demister apparatus is provided. The demister can be used in conjunction with the above device, or separately from it.

Figure 9A:
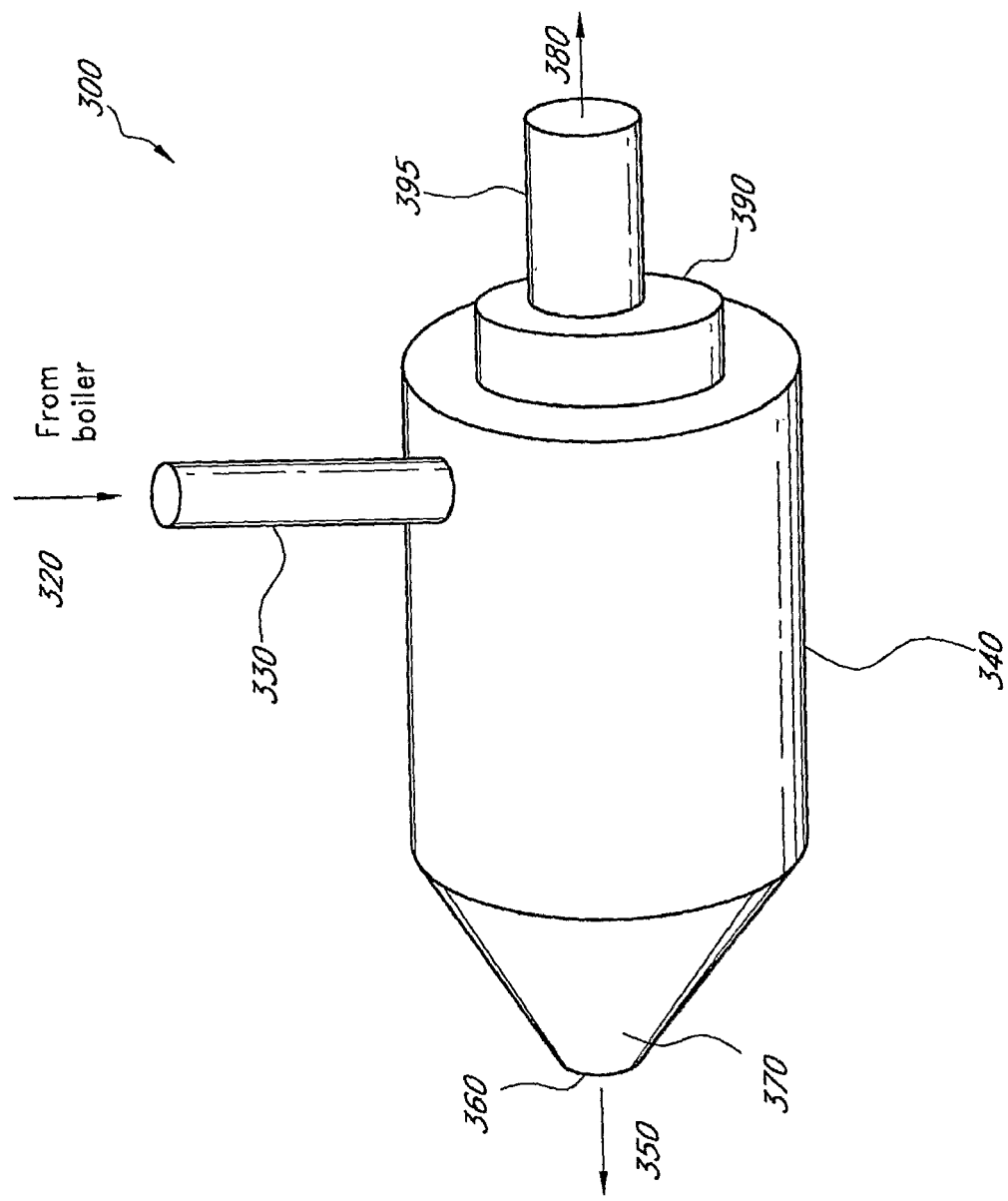
FIG. 9A is a diagram of an exemplary demister apparatus.

The diagram in FIG. 9A illustrates one exemplary demister. Various inlet and outlet apertures can be adjusted by the user to optimize performance. Preferably, an adjustable downcomer tube 395, as illustrated in FIG. 9A, can be used to alter the separation characteristics of the cyclone demister. This adjustable downcomer tube 395 can regulate the ratio of clean to contaminated steam that exits the unit. Further, an adjustable shutter mechanism 370 at the apex or conical outlet 360 of the demister 300 can be used to prevent excessive loss of steam 350.

Incoming steam 320 enters the demister from the boiler 310 through an inlet port 330. The steam 320 enters the demister chamber 340, and is separated in the demister 300 via a centrifugal force created through the rotation of the steam within the chamber. The steam is separated into clean steam 380 and dirty or reject steam 350. The angular velocity of steam within the chamber is a function of the pressure differential through the cyclone and the angle of entry of the steam. Settings for such parameters can be determined by those of skill in the art to optimize performance of the demister.

The reject steam 350 leaves the demister chamber 340 through a reject exit port 360. The reject exit port can contain an adjustable shutter mechanism 370 that allows for better control of the amount of steam that is allowed to leave the demister. In some embodiments, the aperture can be adjusted during operation, or can be adjusted between demister runs. The shutter mechanism can be made out of any suitable material, for example, metal (e.g., stainless steel), ceramics or plastics.

Clean steam 380 exits the demister 300 through an exit port 390 at or near the center of the chamber 340. Preferably, the clean steam exit port 390 has a downcomer tube 395 that can be adjusted so as to alter the amount of tube that is inserted into volume of chamber 340 in order to alter demisting characteristics to suit particular needs. Preferably, the adjustment to the downcomer tube 95 is made by altering the length of the downcomer tube that is present inside the demister chamber. The downcomer tube can collect steam located near the exit 390 itself, or by inserting the downcomer tube into the chamber 340, the downcomer tube 395 can collect steam that is located closer to the center of the chamber. By this method, the ratio of clean to dirty steam exiting through the exit 390 can be controlled. The downcomer tube can be inserted, for example, across about 5-10%, 15%, 20%, 25%, 30%, 40% or more of the length of the demister chamber. The general dimensions can vary. It can be, for example, 5" tall with a 1" diameter at the top of the steam entry port and have a ¼" diameter at the top and bottom tubes. One of skill in the art will be able to adjust the insertion point of the downcomer tube to achieve specific purposes. Preferably, the clean steam exit is located at the top of the demister apparatus.

In some embodiments, both the adjustable shutter 370 and the adjustable downcomer tube 395 are employed in a single embodiment. One of skill in the art will be able to adjust either or both of these through an iterative process in order to obtain the desired amount and purity of clean and dirty steam from the system and the desired amount of steam leaving the chamber. Once the system is functioning as desired, the adjustable features can be fixed in place. This can be done in a variety of ways such as, for example, by welding.

The design of the above demister apparatus can allow the user to precisely adjust for operating conditions, by, for example, adjusting the reject steam aperture, the clean steam aperture, or the length of insertion of the downcomer tube. In this way, the cyclone operation can be optimized. One of skill in the art will be able to adjust these parameters to suit a particular demisting purpose.

The adjustment of the steam inlet port, the reject steam outlet, and the clean steam outlet, can be performed manually. The adjustment control can also be performed remotely. Additionally, electronic systems can be set up to automatically alter the apertures for maximum performance. The aperture adjustment can be completely computer controlled, if desired. An emergency shut off system can be in place, so that the entire system is shut off if pressure reaches a dangerous level, if a component malfunctions, if input flow changes, or if other unforeseen problems occur.

The ability to adjust the demister apertures can allow one to alter the ratio of clean to contaminated steam within a broad range, so as to increase or decrease unit output as a function of water purity. Accordingly, one of skill in the art can adjust the apparatus as needed in order to optimize the process for any type of demisting project.

Figure 9B:
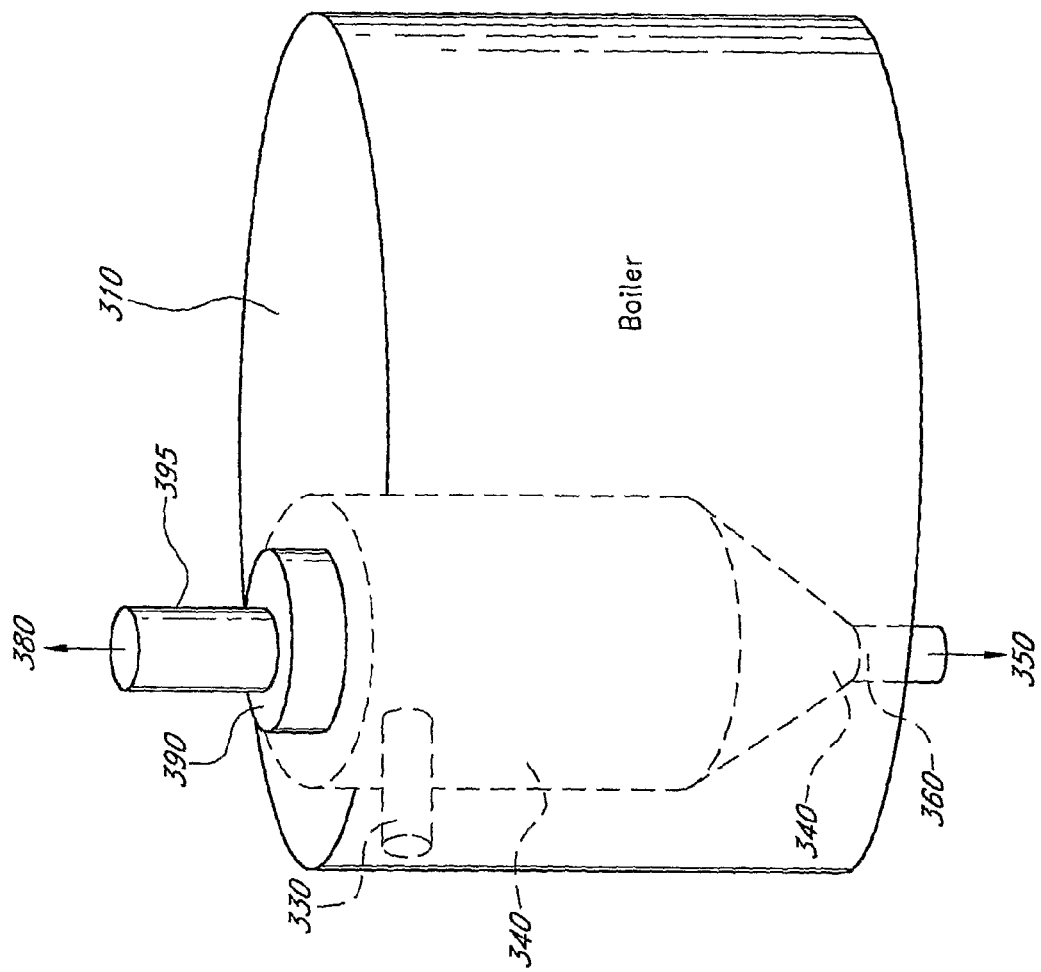
FIG. 9B is a diagram showing the location of an exemplary demister apparatus inside a boiler.

In some embodiments of the invention, at least a portion of the demister is located within the boiler chamber. In further embodiments, most or all of the demister chamber is contained within the boiler chamber. FIG. 9B illustrates an example of this embodiment. The internal placement of the demister can save valuable space, ensure constant temperature and preventing steam condensation. The demister can be placed anywhere within the boiler apparatus. The demister volume ratio to the ratio of the boiler volume can vary. For example, the demister to boiler volume ratio can be in a range of 1:1,000 to 1:0.5, for example, 1:100 to 1:1, 1:5 to 1:2, and 1:10 to 1:3. In general, 1:10 to 1:50 will be useful for a small 6 Ga/day unit; 1:50 to 1:300 will be useful for a medium size (600 Ga/day) unit; and larger ratios for industrial size units. One of skill in the art will be able to determine a suitable demister to boiler volume ratio for a given purpose. As will be appreciated by one of skill in the art, the amount of the demister that is actually within the boiler (or boiling chamber) can vary. In some embodiments any volume or surface area in common between the two chambers is sufficient and can be 100-90, 90-80, 80-50, 50-30, 20-10, 10-0% of the volume or surface area of the demister can be contained within the boiler. In one embodiment, the demister is entirely inside the boiler to prevent heat losses and steam condensation.

As will be appreciated by one of skill in the art, the additional heat provided by the boiler can reduce the amount of condensation that will occur in the demister. For example, a demister heated in this manner can have 50-90%, 90-98%, and more preferably 98% to 100% of a reduction in condensation compared to systems where the demister does not derive heat from the boiler. Additionally, the placement of the demister in the chamber can also effectively shield at least part of the demister from changes in atmospheric conditions, further promoting efficiencies.

The demister chamber, inlet port, reject steam outlet port, clean steam outlet port (downcomer tube) and reject steam aperture shutters can be made of any suitable material. Exemplary materials include but are not limited to stainless steel, a metal or an alloy of titanium, aluminum, copper, polypropylene, Teflon, Kevlar, a ceramic or glass and the like. One of skill in the art will be able to determine a suitable material for a specific purpose. Preferably, the chosen material is heat resistant, crack resistant, and able to withstand extended use. In some embodiments, sections of the demister chamber 340 or the demister 300 that are not in the boiler are made of insulating materials or are covered with an insulating material to help reduce the risk of condensation.

In some embodiments, the demister of the present invention is suitable for any size operation. For example, a small scale, portable demister can be useful for some purposes. For separating mist from steam, the demister diameter can be small so as to achieve high centrifugal forces. In practical terms, this normally means diameters of less than 2", and preferably less than 1". The length or height of the demister determines the residence time of the gas/mist mixture in the device, and can be as short as a few inches to several inches or longer. One of skill in the art will know how to make the particular adjustments in light of the current disclosure. A medium scale demister, a large scale demister, and a commercial scale demister can also be made using the method of the invention.

In some embodiments, the demister apparatus can be adjusted to effectively separate steam with a minimum of pressure loss across the cyclone demister. In some embodiments, the demister apparatus has a reduced likelihood of suffering from condensation of internal steam as the external surface of the demister is heated.

Example 5

Assembly of a demister apparatus

A 1' wide by 3' deep stainless steel demister chamber is fitted with an inlet port for the steam coming from boiler. Additionally, the chamber is fitted with a shutter system to allow adjustments to the reject steam port. Further the clean steam exit port is fitted with a ¼" diameter stainless steel downcomer tube that can be adjusted from 0.25" into the chamber to 2.5" into the chamber. The shutter is initially positioned in the fully open position and the downcomer tube is initially positioned so that it is minimally inside of the chamber. Steam is added to the chamber at a rate that is sufficient to separate the clean and dirty steam. The position of the downcomer tube is adjusted until the desired purity of steam is obtained from the system. Either simultaneously with this adjustment or after this adjustment, the shutter on the waste exit port is adjusted so that the desired amount of clean and waste steam are separated and exit the chamber. The downcomer tube can again be adjusted to achieve the desired purity of steam leaving the chamber. Both the downcomer tube and the shutter are then fixed in place, thereby resulting in an optimized demister.

The demister chamber can then be fitted inside a boiler apparatus. In some embodiments, the top of the demister cylinder is accessible from the top of the boiler apparatus, for ease of maintenance. However, in other embodiments, most or all of the surface area of the demister can be contained within the boiler.

Example 6

Heated Demister

This example demonstrates one embodiment of using the demister contained within a boiler. The volume of the chamber of the demister is located entirely within the boiling chamber. The boiling chamber is heated to produce steam, which is then forced into the demister. The steam enters the demister so that the steam undertakes a rotational motion, thereby separating clean and dirty steam. The clean steam is collected from a downcomer tube. While the steam is being separated, the demister is being heated by the heat from the boiling chamber. This results in less (almost no) condensation being formed in the demister.

Visual Filter Flow Indicator:

In some embodiments, the water purification system described above can include a simple yet effective filter flow indicator that provides an optical indication of how well a filter is performing, that is, how readily water is flowing through the filter. The filter can be located before the water enters the boiling chamber or the degasser, or at any point throughout, after, or before the water purification system described above. Additionally, as will be appreciated by one of skill in the art, in some embodiments, the visual flow indicator can be used anywhere where a pressure difference is to be monitored or where a filter is located.

In some embodiments, the filter flow indicator includes a side passage that connects the input and output sides of the filter unit. A weighted object is located in the side passage and can move up and down in response to the pressure differential in the filter system. A selective restraining device keeps the weighted object from moving beyond a set point. When the weighted object hits the restraining device, the object can be readily viewed by the user by looking through the side passage. Thus, the filter flow indicator can provide a visual indication of how water is flowing through a filter.

In some embodiments, the filter flow indicator of the present invention can provide a simple and convenient indication of system operations for service or user monitoring. The filter flow indicator preferably operates by inserting it onto a line of the water supply in a vertical position, such that the weighted object, such as a plastic ball, sits at the bottom of the side tube. Under normal operation, no user intervention is necessary to monitor the filtering ability of the filter in the line. The user can simply view the location of the weighted object in relation to the pin to determine whether the filter device is functioning properly or if it is so clogged that it is not filtering as efficiently as desired. In some embodiments, the filter flow indicator is also useful in determining if there is a hole in the filter, by examining for opposite directions of movement by the weighted object.

The side passage can be made of any suitable material. Preferably, the side passage is transparent or nearly transparent so that the weighted object can be viewed easily. Accordingly, in preferred embodiments, materials such as glass or plastics can be used. Preferably, the material is relatively pressure resistant and resistant to cracking or breakage. In one embodiment, the side passage itself is tapered, so that the weighted object experiences resistance against the walls of the side passage as it is forced up the passage. As will be appreciated by one of skill in the art, the side passage can be connected to the filter connector units by a variety of devices or methods. For example, the side passage can be connected to the filter connector units by metal connectors with O-rings, compression fittings, or other type of metal or plastic fittings. In a preferred embodiment, the sides are not tapered so that even when the object is pushed against the pin, water can still flow around the object, thereby providing a channel through which pressure in the water line can be reduced even if the filter becomes completely clogged. Preferably, the connection of the passage to the water line will be strong enough so that the side passage will not be likely to break off of the system if the pressure rises. Typical pressures could be from 100-200 psi.

The weighted object can be any shape and size, as long as it is capable of moving up or down in the side passage in response to the pressure differential in the filter unit. The weighted object can be, for example, spherical, square, oblong, amorphous, or can have another suitable shape. The weighted object can be any color. Preferably, the weighted object is a sphere. Preferably, the weighted object is slightly smaller than the inner diameter of the side passage. More preferably, the weighted object is a red ball so that it can be easily visualized. The object can be made from a variety of materials. In a preferred embodiment, the object is heavier than water and relatively inert in water, so as not to contaminate the water being filtered. For example, the sphere can be made of various metals, such as titanium or stainless steel, ceramics, plastics, etc. Additionally the object can be a composite object, for example, a stainless steel core with a plastic coating. For easy visualization, the sphere can be about ¼ inch (0.8 cm) in diameter and could be as large as twice that size. Larger sizes can add to the weight of the ball that will move in response to pressure differences and thus could be less responsive.

Figure 10A:
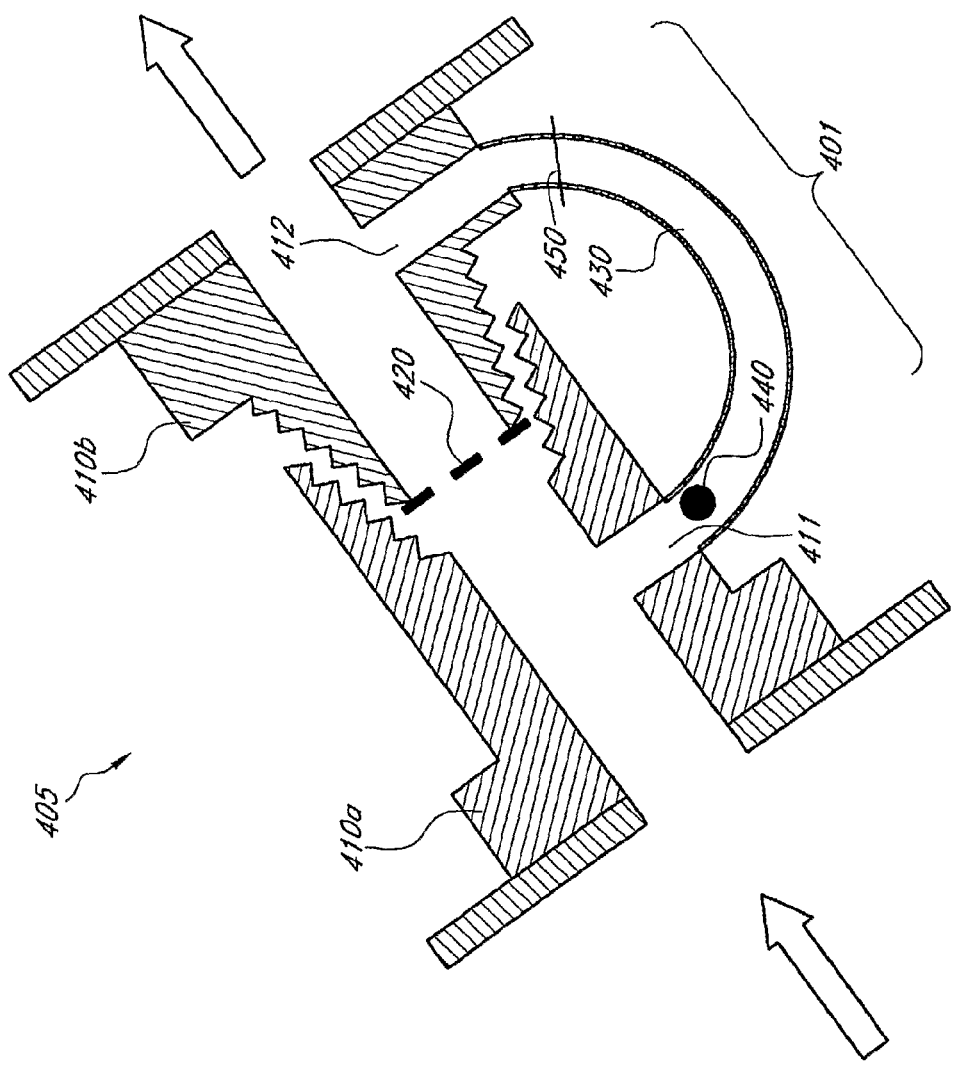
FIG. 10A is a schematic and assembly diagram of an exemplary filter flow indicator.

The filter flow indicator 401 (FIG. 10A) can be assembled onto any type of filtration apparatus 405. In some embodiments of the invention, the filter flow indicator 401 is assembled onto the two parts of a screw type filtration device 405, as shown in FIG. 10A, which can be found at lab supply stores, or off the shelf at gardening stores, home improvement stores, and the like. The filter connection units 410a and 410b can be chosen from any type of filter connectors. Preferably, the filter connection 410a and 410b units are interlocking. Preferably, the filtration device 405 is arranged upright so that the liquid exhibits a vertical flow through the system.

In a preferred embodiment, the filter flow indicator 401 is part of a filter device 405, as shown in FIG. 10A. The apparatus has two interlocking plastic connectors 410a and 410b with a filter or filtering screen 420 that is mechanically secured between the two plastic connectors 410a and 410b. Each of the plastic connectors 410a and 410b has an aperture 411 and 412 on either side of the filter to which a side tube or passage 430 is connected. A colored plastic ball 440 with a diameter slightly smaller than the side tube 430 is in the side tube, and a small pin 450 is in the side tube 430 about midway to prevent the movement of the colored ball beyond a desired point.

As the filter traps particulates in the water stream it gradually loses its effective porosity, thus creating a pressure differential across the filter 420. The pressure differential across the filter in turn begins to exert more of a force on the weighted object 440 in the side passage 430, so that it moves inside the side passage 430 until it lodges against the pin 450, whereupon it cannot move any further up the side passage. By mounting the whole assembly vertically so that the force of gravity keeps the weighted object 440 from moving up the side tube 430 until sufficient clogging of the filter has occurred, the system readily shows the point at which the filter needs replacement or cleaning. In some embodiments, there is a second pin inserted behind the weighted object 440, so that the ball will not leave the side passage if there is a change in water pressure. As will be appreciated by one of skill in the art, the entire device need not be positioned in a vertical alignment, as just the portion required to indicate an increase in pressure can be vertical. Thus, in some embodiments, neither the filter nor the entire filter flow indicator is positioned vertically. In some embodiments, the object need not be weighted and is maintained in the side passage with a spring or set of springs and deviation from a set position will indicate that the filter needs to be changed. Thus, in some embodiments, the only requirement for the object in the side passage is that it exerts some force against the flow of water through the side passage, so that when the flow of water through the side passage changes, this change will result in a change in position of the object.

As will be appreciated by one of skill in the art, the length of the side passage, weight and size of the weighted object, and position of the weighted object as an indicator of a clogged filter can vary between particular uses of the device, for example, the rate of flow of the water or type of filter being used.

One of skill in the art will recognize, in light of the present disclosure, that it is possible to adjust these variables to achieve the desired described results. For example, one can simply add differently sized weighted objects or differently weighted objects until one finds an object that, at the given flow rate, with the given filter, does not immediately flow to the furthest position on the side passage. Additionally, this same process can be used to eliminate those objects that are too heavy to move to the furthest position in the side passage when the filter is clogged.

As will be appreciated by one of skill in the art, when a filter is "clogged" can depend upon the particular type of filter, the substance being purified, the substance being removed, anticipated future uses, etc. For a given application, one of skill in the art, in light of the present disclosure, will be able to determine when a filter is clogged and calibrate the filter flow indicator accordingly.

The apparatus can work with any type of filtration system. Examples of types of filtration systems that are contemplated include but are not limited to a filter that separates particulate matter from liquid, a filter that separates specific biochemical molecules from a liquid, a filter that removes microbial matter, a filter that removes molecules based on charge, and the like.

In some embodiments, the filter flow indicator can indicate when a filter allows too much water to pass through the filter, for example, when the filter bursts. This can be done by balancing the weight of the ball with the pressure of the water so that a normal amount of pressure difference between the chambers in 410a and 410b will result in the weighted object moving slightly up the side passage, but not all the way to the pin 450. If the weighted object descends when the water should otherwise force it part way up the side passage, it can indicate that too much water is flowing through the filter.

As will be appreciated by one of skill in the art, if a filter becomes clogged and does not burst, then there is a risk that an increase in water pressure will occur in the flow line. In certain situations, the water pressure can increase to a point where it might normally cause damage to the flow line or the pump device. In some embodiments, the side passage 430 is configured to serve as a pressure release device or bypass for the flow of water. Thus, the side passage can be connected in such a way as to disconnect from the two connectors 410a and 410b when excessive amounts of pressure pass through the side passage. This can also be an advantage in systems where the filter itself could be damaged by excessive pressure, allowing the water to leave the flow line through the holes 411 and 412 in the connectors 410a and 410b. In some embodiments, a bin or waste line is provided in fluid communication with the holes 411 and 412 of the connectors 10a and 10b so that any excess water is collected or diverted to a desired location. In some embodiments, the whole side passage 430 or a part of it will disconnect from the flow line to expose a hole 411 and 412. In other embodiments, the side passage need not disconnect and can instead "burst" under the increased pressure, providing an alternative exit through water can leave the flow line.

Figure 10B:
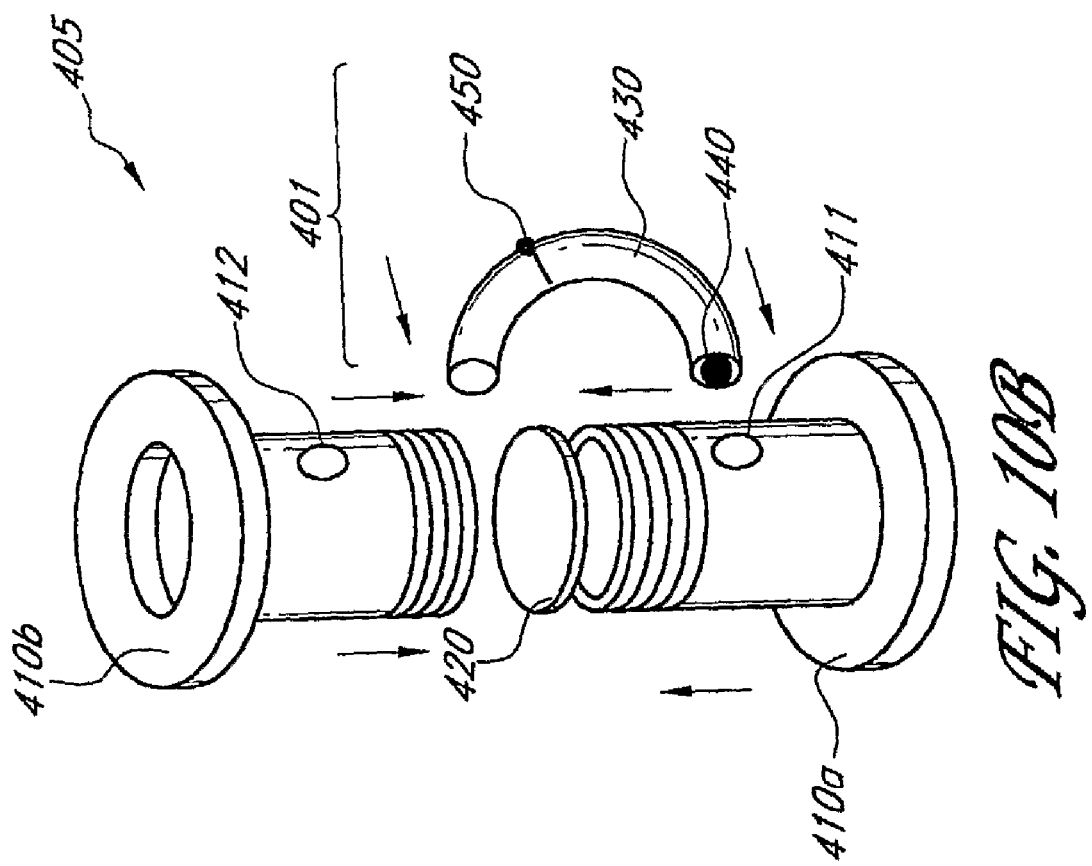
FIG. 10B is a diagram illustrating examples of the various items used for some of the embodiments of the invention and their spatial relationship.

FIG. 10B demonstrates how the filter flow indicator can be assembled. The plastic connectors 410 are first prepared by drilling the side holes 411 and 412, and then connected together with a filter 420 in between and compressed by the two connectors 410a and 410b. The plastic ball 440 is then inserted into the side tube 430 and the side tube assembly is connected either by welding or pressure to the connector assembly at the holes 411 and 412.

The optical filter control system can be used to provide necessary electrical overrides in case of over-temperature and electrical shorts. For example, the system can be arranged so that the water flow automatically stops when the weighted object reaches the stop pin.

Example 7

Assembly of an Optical Filter Flow Indicator

An optical filter flow indicator can be assembled using off-the-shelf components purchased from lab supply stores. Filter connector units are connected to a 0.2 μm filter that snugly fits inside the connector units. A hole is drilled into the side of each connector. A 2-inch piece of polyethylene tubing is fitted with a small red polypropylene coated stainless steel ball. The tubing is additionally fitted with a stop pin in the end away from the incoming flow of water. Each end of the tubing is then fitted into the filter connector units and secured using a suitable adhesive.

Example 8

Operation of an Optical Filter Flow Indicator

This example demonstrates how a filter flow indicator can be used to monitor a filter apparatus that is used to remove particulates from drinking. A commercially available water filtration cartridge apparatus is fitted onto a flow line of water. A side passage connects to either side of the filter in the flow line and is made of transparent polyethylene tubing. The side passage contains a small ball and a stop pin at the end distal to the flow of water. This section of the side passage is oriented vertically. A pump is used to move the liquid through the filter at a rate of 1 gallon per minute.

Initially, the flow indicator can be calibrated for the particular filter. Using a clean filter and clean water, water is forced through the filter at the desired rate. Variously sized and weighted balls are placed in the side passage and tested to see where they rest during the desired flow rate. A set of balls is selected that do not drop out of the side passage and are not forced into the upper section of the side passage, towards the stop pin. The filter can be replaced with a "clogged" filter and water again run through the system. The ball selected will be one that moves to the upper section of the side passage, near or to the stop pin.

The ability of the filter to efficiently filter water is monitored visually by the user based on the position of the ball. When the ball hits the stop pin it indicates a clogged filter. The filtering can be stopped and the filter replaced or cleaned. Apparatus for Restoring the Mineral Content of Drinking Water:

In some embodiments of the present invention, a device for imparting a desirable or particular taste to pure water is provided. This is done through the use of a reverse-filter that preferably provides for natural flavoring while preserving the purity of the product water with respect to undesirable impurities. The reverse-filter can contain components or minerals typically found in spring waters, thereby adding these components or minerals back to the chemically purified water to improve the taste. As will be appreciated by one of skill in the art, this can be particularly beneficial when used following the purification systems described herein. However, the presently described device can be used separately as well, for example, on a water faucet, drinking fountain, or on a container.

Figure 11:
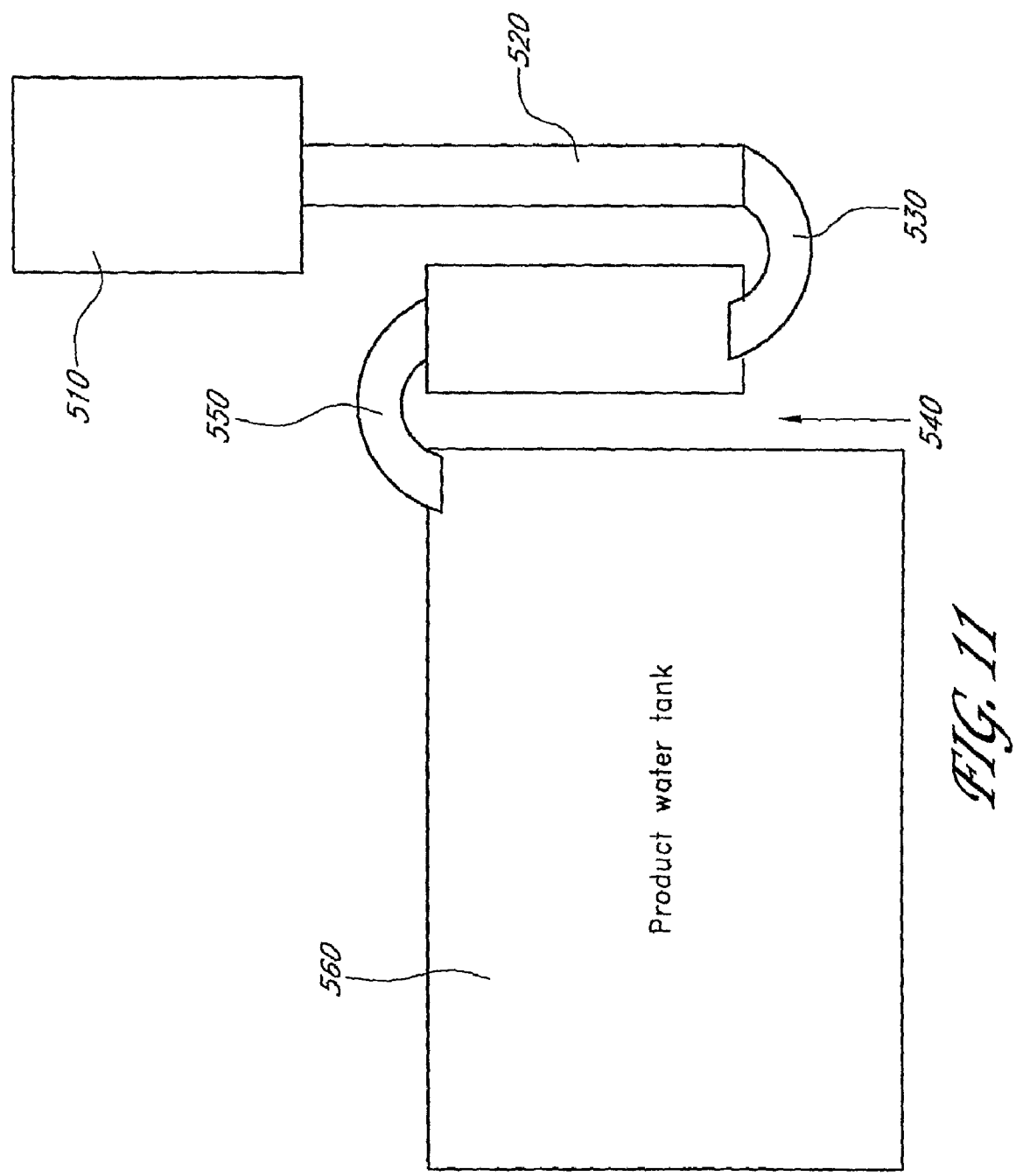
FIG. 11 is a schematic diagram of an exemplary device of the invention.

FIG. 11 depicts various components that might be used with a reverse-filter. These include, for example, a condenser 510, conductivity meter 520, connector tubing 530 and 550, the reverse-filter 540, and product water tank 560.

The flavoring system can contain a mineral reverse-filter 540, or "reverse mineral filter," which contains at least one soluble mineral. As will be appreciated by one of skill in the art, certain ions, such as magnesium, calcium, potassium, and sodium are found in many spring waters that are renowned for their taste. Additionally, certain anions, such as carbonate, bicarbonate, and occasionally some sulfate are also found in premium spring waters. Thus, by using a device that adds these or other minerals back to the purified water in an appropriate amount, one can achieve water that is free from undesired contaminants, but still has those minerals that add taste or flavor to the water.

The reverse-mineral filter can include ground rocks commonly found in spring reservoirs, such as Andalusite: $Al_2OSiO_4$; Anorthite: $CaAl_2Si_2O_3$; Anthophyllite: $(Mg,Fe)_7Si_3O_{22}(OH,F)_2$; Apatite: $Ca_5(PO_4)_3(OH,F,Cl)$; Biotite: $K(Mg,Fe)_3AlSiO_3O_{10}(OH,F)_2$; Chlorite: $(Mg,Al,Fe)_{12}(Si,Al)_8O_{20}(OH)_{16}$; Cordierite: $Al_3(Mg,Fe)_2Si_5Al_2O_{18}$; Dolomite: $CaMg(CO3)_2$; Hornblende: $(Ca,Na,K)_{2-3}(Mg,FeFe^{3+}Al)_5Si_6(Si,Al)_2O_{22}(OH,F)_2$; Magnesite: $MgCO_3$; Olivine: $(Mg,Fe)SiO_4$; and Talc: $Mg_3Si_4O_{10}(OH)_2$.

Additional compositions that can be used can be found in Table 3 below.

TABLE 3

Synthetic Chemicals

| Mineral | Composition | CAS N° | Sp. Gr. | Solubility. Gr/100 ml | Solubility. ppm | Sol. Product |
|---|---|---|---|---|---|---|
| Calcium hydroxide | Ca(OH)2 | 1305-62-0 | 2.24 | 0.18 | | 5.50E−06 |
| Calcium Nitrate | Ca(NO3)2 | 10124-37-5 | | 38 | | |
| Calcium Carbonate | CaCO3 | 471-34-1 | 2.93 | 6.69E−05 moles/L | 13 ppm @212 F. | 3.80E−09 |
| Calcium bicarbonate | Ca(HCO3)2 | 3983-19-5 | | | 1,620 ppm | |
| Calcium Chloride | CaCl2 | 10043-52-4 | | 74.5 | 554,000 ppm @212 F. | |
| Calcium sulfate | CaSO4 | 7778-18-9 | 2.96 | 0.209 | 1,246 ppm @212 F. | 9.10E−06 |
| Magnesium hydroxide | Mg(OH)2 | 1309-42-8 | | 0.0009 | | 1.80E−11 |
| Magnesium carbonate | MgCO3 | 13717-00-5 | | 0.02 | 75 ppm @212 F. | 6.82E−06 |
| Magnesium bicarbonate | Mg(HCO3)2 | | | | 37,100 ppm | 3.50E−08 |
| Magnesium Chloride | MgCl2 | 7786-30-3 | | | 443,000 ppm @212 F. | |
| Magnesium sulfate | MgSO4 | 7487-88-9 | 2.66 | 71 | 356,000 ppm @212 F. | |
| Magnesium nitrate | Mg(NO3)2 | 10377-60-3 | | 125 | | |

TABLE 3-continued

Synthetic Chemicals

| Mineral | Composition | CAS N° | Sp. Gr. | Solubility. Gr/100 ml | Solubility. ppm | Sol. Product |
|---|---|---|---|---|---|---|
| Sodium hydroxide | NaOH | 1310-73-2 | 2.13 | 50 | | |
| Sodium Carbonate | Na2CO3 | 497-19-8 | 2.532 | | 5310 mg/L | |
| Sodium bicarbonate | NaHCO3 | 144-55-8 | 2.159 | 10.3 | | |
| Sodium chloride | NaCl | 7647-14-5 | 2.165 | 35.9 | | |
| Sodium sulfate | Na2SO4 | 7757-82-6 | 2.68 | 66.66666667 | | |
| Sodium nitrate | NaNO3 | 7631-99-4 | 2.26 | 81.5 | | |
| Potassium hydroxide | KOH | 1310-58-3 | 2.044 | 107 | | |
| Potassium carbonate | K2CO3 | 584-08-7 | 2.29 | 147 | | |
| Potassium bicarbonate | KHCO3 | 298-14-6 | 2.17 | 22.4 | | |
| Potassium chloride | KCl | 7447-40-7 | 1.984 | 28.1 | | |
| Potassium sulfate | K2SO4 | 7778-80-5 | 2.662 | 12 | | |
| Potassium nitrate | KNO3 | 7757-79-1 | 2.109 | 38 | | |

Table 3 summarizes solubility values, including solubility product data, for a number of inorganic salts containing the ions normally found in various mineral waters, worldwide. Through the use of Table 1 (as well as through other known chemical characteristics of other compounds), it is possible to combine different salts in such proportion so as to reproduce the composition of any mineral water found in nature. As will be appreciated by one of skill in the art, the precise amounts and combinations can vary depending upon the particularly desired end product.

Preferably, the reverse-mineral filter 40 includes one or more of the above minerals, and can also be a combination of such minerals or other minerals. In some embodiments of the invention, the reverse-mineral filter can be used to restore a mineral content to chemically pure water such that the ratios of metallic and non-metallic ions resembles those found in natural spring waters. Typically, such waters contain sodium, potassium, magnesium, and calcium ions in concentrations of a few parts per million (ppm) up to 100 ppm, more preferably 1-10 ppm. They also contain anions, such as bicarbonate, carbonate, sulfate and chlorine in concentrations similar to those of metal cations. One of skill in the art will be able to supply suitable amounts of each of the chosen minerals to result in a mineral or spring water-like product. Additionally, other desired materials, such as gasses, can be added easily to the system. Additionally, the pH of the water, hardness, and phosphorus content of the water can be adjusted to achieve the desired product water. Additionally, the presence and amount of trace elements can also be adjusted, including, for example, iron, iodine, copper, fluoride, zinc, and any combination thereof.

Preferably, the minerals are ground to a standard size, based on a mineral's ability to dissolve in water, or its solvation characteristics. Grinding the minerals also allows one to increase the surface area of the minerals, and to better control the size of the different fractions that are added to the reverse-filter. The size of the particles can alter the ability of the particles to release the ions into the water. This in turn can alter the final concentration of the minerals present in the product water. One of skill in the art will be able to determine the appropriate size of particle to use for each type of mineral selected to obtain the desired amount of mineral in the product water.

As there is a wide range of possible desired mineral waters, the particulars of any reverse filter, in particular the amount and size of the minerals, can vary dramatically. General factors to consider include the rate of flow of pure water through the filter and the temperature of the water and the filter. For a particular type of desired product water, one determines the type of minerals needed, how much of each mineral is required, the relative amounts of each mineral required, and the relative and absolute solubilities of each mineral. For example, minerals that have relatively low solubilities but are required to be present in relatively high amounts in the product water can be present in high amounts in the filter and can be ground relatively finely. As discussed, size of the particles of the various minerals can vary. In some embodiments they range from 100 nm to 1 m, more preferably 1 micron to 1 cm, more preferably 10 microns to 1 mm, and more preferably 100 microns to 1 mm. Of course, larger and smaller sizes are possible where appropriate. As will be appreciated by one of skill in the art, the larger sizes, for example 10 cm to 1 m or more would not normally be applicable for a home use system. The preferred size can be a function of the solubility of the particular minerals. The solubility becomes greater when the particle size of the mineral is very small, as when the mineral is finely ground. The grinding action distorts the mineral lattice and creates high-energy sites, which are the sites that more easily dissolve in water. As will be appreciated by one of skill in the art, as the natural mineral waters are naturally derived by running water through these minerals, running the purified water through the same types of minerals, although under different conditions can also be employed to achieve the same result.

Although minerals are commonly classified as being insoluble, this classification is based on relative, rather than absolute, terms. For example, solids are normally classified as insoluble if they yield concentrations in water less than 0.1 mol/l. However, a more accurate way to measure solubility is in terms of either the solubility product or the ionization constant in a given fluid. Both measure the amount of solubilized or ionized species per unit volume when in contact with the given solid.

The minerals listed above have a fairly wide range of solubilities. Therefore, in some embodiments, the minerals can release ions into the water at different rates, thus ensuring a long-lasting life for the reverse-mineral filter. In some embodiments, any material that is lost from the reverse-filter can be easily replaced by pouring additional ground mineral material into the reverse-filter housing. In other embodiments, the entire reverse-filter cartridge can be replaced when the functionality of the minerals has passed. In some embodiments the minerals themselves are contained within separate areas of the reverse-filter, so that separate flows of water are sent through each type of mineral. Alternatively, the minerals can be mixed together and one flow of water passed over all of them. As will be appreciated by one of skill in the art, while a reverse mineral filter may no longer function because the minerals are gone, it may also lose its ability to function because too many pieces of the minerals are smaller than they should be, thus altering the taste of the water in a different manner.

The rate of release of the minerals into the water can involve many factors, such as temperature, size of the mineral particles, pH of the system, the amount of mineral present, and other factors. One of skill in the art will be able to determine the amount of a mineral to be added to achieve the desired effect. Additionally, other factors, such as the duration that the water stays in contact with the mineral, the force with which the water contacts the mineral particles, and if the mineral particles can forcibly hit each other and further increase their surface areas by breaking apart, can also influence the final amount of mineral that is present in the flavored water.

In some embodiments, the reverse filter is designed to increase or decrease one or more of the above factors. Thus, for example, in some embodiments the reverse filter is heated to improve the dissolving ability of the pure water.

One of skill in the art will be able to determine the type of mineral, the amount of mineral, the solubility of a mineral to be used, and a suitable size of the ground mineral particles to be used. As will be appreciated by one of skill in the art, other compounds, in addition to minerals, can be used to add flavoring to the water. Additionally, gases, such as air; or carbon dioxide to provide for carbonation can be added or one can add natural flavors, such as lemon, orange, etc. Such compounds are generically referred to as "flavoring compounds." Those flavoring compounds (mineral based or otherwise) found inside the reverse-filter container 540, are termed "resident particles." As will be appreciated by one of skill in the art, while the specification primarily discusses minerals as the flavoring compounds, other flavoring compounds can be used as well in many of these embodiments.

In some embodiments, the final water is similar to "mineral water" and contains about 250 ppm total dissolved solids, or more. While the water may not be technically considered "mineral water," because the minerals are added to the purified water, in all other aspects, the final water can be the same. In some embodiments, the final water has a "low mineral content" and has less than 500 ppm total dissolved solids (TDS) content. In other embodiments, the final water has between 500 and 1500 ppm of TDS content. In yet other embodiments, the final water has a "high mineral content" and has more than 1500 ppm of TDS content.

In some embodiments, the reverse filter is configured so as to result in a water product with the same mineral content as that of a particular type of mineral water. For example, the reverse filter can be configured to produce water with 71 mg/ml calcium, 7.5 mg/ml magnesium, 2.7 mg/ml sodium, 1.0 mg/ml potassium, 0.2 mg/ml fluoride, 0.01 mg/ml iron, 0.01 mg/ml zinc, 221 mg/ml TDS, 190 mg/ml $CaCO_3$, and a pH of 7.7. Such water can taste identical to that of MOUNTAIN VALLEY® spring water. As will be appreciated by one of skill in the art, any mineral water can also be created, for example, ARROWHEAD®, CALISTOGA®, DEER PARK®, ICE MOUNTAIN®, OZARKA®, PERRIER®, S. PELLEGRINO®, ZEPHYRHILLS®, and VITTEL® waters.

The minerals or other flavoring compounds can be treated in various manners so as to alter the ability of the compounds to dissolve in water. For example, as discussed above, the minerals can be ground into smaller parts to add to the flavoring. In some embodiments, the minerals can be heated or cooled to alter their ability to dissolve in water. The minerals or other compounds can be treated with additional compounds or mixed with additional compounds to increase or reduce the rate of solvation. Likewise, in some embodiments, the minerals or flavoring compounds can be processed with an autoclave or device that can sterilize the minerals or compounds.

The reverse-mineral filter can be housed, if desired, in any suitable material. Exemplary housing materials include but are not limited to glass, metal, plastic, polyethylene, polypropylene, stone, ceramic, rubber and the like. As will be appreciated by one of skill in the art, the reverse-filter can be a relatively simple container with an entrance at one end for the pure water, an exit for flavor treated water at the other end, and a body to hold the minerals.

In some embodiments, the exit is covered with a screen or filter that has holes that are sized to retain the ground minerals but large enough to allow water to flow through. In one embodiment, the holes in the screen are small enough so that only particles that are too small for a drinker to detect by drinking the water can pass through. In some embodiments, the creation of smaller sized particles of minerals that can flow through the screens and into the drinking water is dealt with by pre-flowing water through the filter to remove any of these smaller particles that are initially in the reverse-filter.

In some embodiments, the reverse-filter includes a secondary particle filter. While the screen described above will have divisions that are small enough to prevent the initially sized particles from passing through, and into the product tank or receptacle, a secondary screen can be used to capture the used particles when they are reduced in size and may be capable of flowing through the initial screen discussed above. This secondary filter can be placed in variety of locations, and even after the product water tank. However, it is preferably placed after the reverse-filter and before the product tank.

In some embodiments, the chamber contains a series of tubes that will increase the distance through which the water must pass to leave the reverse-filter. These tubes can be filled with the ground minerals. The addition of the tubes can increase the time period that the water can stay in contact with the mineral(s). In other embodiments, the chamber has various structures to redirect the flow of water within the reverse-filter for increased dissolving of the flavoring compounds. In some embodiments, the reverse-filter includes an aeration unit to dissolve gasses back into the purified water. In some embodiments, carbon dioxide is also added to the water. A small amount of carbon dioxide can be added for flavoring, or enough so that the water is "sparkling."

As shown in FIG. 11, the relatively pure water can enter the bottom of the reverse-filter, pass up through the entire length of the reverse-filter, and leave through the top and into a product water tank. This allows for water to saturate the container with water before it leaves the reverse-filter. In alternative embodiments, the water enters through the top of the reverse-filter and exits through the bottom. In alternative embodiments, the reverse-filter is positioned horizontally and water passes from one vertical side through to the other vertical side. As will be appreciated by one of skill in the art, each of these embodiments can have certain advantages. For example, a water exit at the bottom of the reverse-filter allows for water to be removed after it is run through the system, thus avoiding any standing water in the reverse-filter that might continue to dissolve the minerals and become over saturated with flavor. Alternatively, the same result can be achieved in the embodiment depicted in FIG. 11, by adding a drain and valve at the base of the pipe 30 between the reverse-filter and the conductivity meter.

In some embodiments, the reverse-filter 540 is part of a larger system, as shown in FIG. 11. The system can include a condenser 510 to convert steam into liquid, a conductivity meter 520 to monitor the amount of ions in the resulting water, followed by the reverse-filter 540 and a product tank 560. The conductivity meter 520 can be used to guarantee water purity before the mineral rocks impart the beneficial flavor. Connector tubing 530 and 550 can be used to connect the condenser 510, conductivity meter 520, and reverse-filter 540, and can be made of any suitable material, such as, for example, a metal, glass, polypropylene, plastic, or other material. A product water tank 560 to store the purified water is also shown. As will be appreciated by one of skill in the art, the product water tank can take various forms, for example, a high volume tank, individual water bottles, or even a drinking glass.

The system can be made on a small scale, such as, for example, attached to a single spigot of a household water source, or can be scaled up to be used for commercial-scale water purification procedures. The water so prepared can be packaged and stored, for example, in bottles for future use.

In some embodiments, a kit is provided for flavoring water with minerals. The kit includes a container that is the housing of the reverse-filter and a selection of pre-ground minerals in separate containers. The user can add various minerals in various amounts to the housing to customize the taste of the water coming from the reverse-filter. In some embodiments, a taste chart, identifying which minerals have a particular flavor is provided with the kit.

Example 7

Preparation of a Reverse-Filter Unit

A mineral combination is prepared by grinding one part of Andalusite ($Al_2OSiO_4$); one part of Dolomite ($CaMg(CO_3)$); one half part of biotite; one half part of magnesite; and one-half part of Cordierite ($Al_3(Mg,Fe)_2Si_5Al_2O_{18}$) into approximately 100 nm sized particles. The material is mixed and packed into a 5" by 4" reverse-filter housing unit made of polypropylene, and the unit is stored at room temperature prior to use. Commercially purified water is allowed to flow through the filter apparatus at a rate of 20 ml per minute. By using this technique, the flavor of the water is altered.

Example 8

Reverse-Filter Unit and Method of Use

A mineral composition is prepared from biotite and magnesite. The mineral is ground to an appropriate size, such as 50 nm. The ground mineral is packed into a 5' by 10" metal housing. Additional inlet filters and outlet filters are added to keep the ground material in place. A second reverse filter is added containing a mixture of citric acid and potassium bicarbonate, so that the resulting carbondioxide gas that evolves in contact with water is partially incorporated into the product water.

Water is then purified by running the water through a degasser, a boiler, a demister, and finally a condenser. This purified water (deionized, demineralized, departiculated) is allowed to flow through the metal housing at a rate of 20 ml per minute. Initially, the water is allowed to flow through to remove any particulate matter from the reverse-filter that can flow through the reverse-filter.

A pressure monitor is placed at the inlet side of the mineral filter so the flow rate can be controlled to adjust to any pressure changes that occur. The purity of the inlet is measured by a conductivity meter, and the amount of mineralization flowing into the water is measured by a conductivity meter on the outlet side of the system. The water flows into a product water tank, from which the water is further adjusted and bottled. Using this method, high quality, purified water having the flavor of water from a biotite mineral spring is prepared.

Example 9

Adjusting the Components of the Reverse Filter for a Desired Taste

While one of skill in the art will appreciate that selecting the particular minerals, their amounts, and the relative particle size of the minerals can be done through various calculations involving a given ingredient list and solubility tables, the ingredients can also be selected in more of an iterative process.

First, one can start with a simple mineral, such as Dolomite: $CaMg(CO3)_2$, and add medium sized particles of the mineral to the chamber of the reverse filter. Water can be run through the reverse filter containing the Dolomite and the water tasted. If the flavor is too strong, the mineral can be replaced with the same mineral but that is made of particles of a larger size. If the flavor is too weak, the particles are replaced with a larger amount of particles or particles of a smaller size, or both. One can further customize the water by repeating the above steps with additional minerals in the same reverse filter.

In some embodiments, the system for purifying water, parts and embodiments of which are disclosed herein (including the demister, filter flow indicator, and reverse-filter, for example), can be combined with other systems and devices to provide further beneficial features. For example, the system can be used in conjunction with any of the devices or methods disclosed in U.S. Provisional Patent Application No. 60/676, 870 entitled, SOLAR ALIGNMENT DEVICE, filed May 2, 2005; U.S. Provisional Patent Application No. 60/697,104 entitled, VISUAL WATER FLOW INDICATOR, filed Jul. 6, 2005; U.S. Provisional Patent Application No. 60/697,106 entitled, APPARATUS FOR RESTORING THE MINERAL CONTENT OF DRINKING WATER, filed Jul. 6, 2005; U.S. Provisional Patent Application No. 60/697,107 entitled, IMPROVED CYCLONE DEMISTER, filed Jul. 6, 2005; PCT Application No: US2004/039993, filed Dec. 1, 2004; PCT Application No: US2004/039991, filed Dec. 1, 2004; and U.S. Provisional Patent Application No. 60/526,580, filed Dec. 2, 2003; U.S. Provisional App. No. 60/526,530, filed Dec. 2, 2003; U.S. Provisional App. No. 60/526,580, filed Dec. 2, 2003; U.S. patent application Ser. No. 11/255,083, filed Oct. 19, 2005; PCT Application No: PCT/US2006/015859, filed Apr. 28, 2006; U.S. App. No. 60/676,870, filed May 2, 2005; U.S. Provisional Application Nos. 60/778,680, filed Mar., 3, 2006, 60/779,201, filed Mar. 3, 2006; 60/727,106, filed Oct. 14, 2005; and 60/748,496, filed Dec. 7, 2005, each of which is incorporated by reference in its entirety.

One skilled in the art will appreciate that these methods and devices are and may be adapted to carry out the objects and obtain the ends and advantages mentioned, as well as various other advantages and benefits. The methods, procedures, and devices described herein are presently representative of preferred embodiments and are exemplary and are not intended as limitations on the scope of the invention. Changes therein and other uses will occur to those skilled in the art which are encompassed within the spirit of the invention and are defined by the scope of the disclosure.

It will be apparent to one skilled in the art that varying substitutions and modifications can be made to the invention disclosed herein without departing from the scope and spirit of the invention.

Those skilled in the art recognize that the aspects and embodiments of the invention set forth herein can be practiced separate from each other or in conjunction with each other. Therefore, combinations of separate embodiments are within the scope of the invention as disclosed herein.

All patents and publications are herein incorporated by reference to the same extent as if each individual publication was specifically and individually indicated to be incorporated by reference.

The invention illustratively described herein suitably can be practiced in the absence of any element or elements, limitation or limitations which is not specifically disclosed herein. The terms and expressions which have been employed are used as terms of description and not of limitation, and there is no intention that in the use of such terms and expressions indicates the exclusion of equivalents of the features shown and described or portions thereof. It is recognized that various modifications are possible within the scope of the invention disclosed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the disclosure.

What is claimed is:

1. A mineral based water flavor enhancer, said flavor enhancer comprising:
a condenser;
a conductivity meter in fluid communication with the condenser;
a mineral chamber containing at least one mineral, wherein said mineral chamber is in fluid communication with said condenser and said conductivity meter wherein the at least one mineral is in a correct quantity and particle size so as to flavor water passing through the mineral chamber to taste similar to a desired mineral water.

2. A method of flavoring water, said method comprising:
condensing steam into water in a container; and
passing said condensed water through a chamber comprising minerals.

3. A drinking water, water purification device, comprising:
a boiling chamber;
a degasser in liquid communication with said boiling chamber;
a water input pipe in fluid communication with said boiling chamber;
a water filter positioned inside of said input pipe;
a pressure indicator, said pressure indicator comprising 1) a side passage that connects a first volume of the input pipe to a second volume of the input pipe, wherein the first and second volumes are separated by the water filter, wherein an interior space of the side passage is visible from the exterior of the side passage; and 2) a weighted object in said side passage that is moveable within the side passage, and wherein said movement occurs based upon a change in pressure between the first volume and the second volume;
a demister in vapor communication with said boiling chamber, said demister comprising 1) an inlet for steam, said inlet positioned on the demister chamber so that steam from the boiling chamber is forced into a rotational motion in the demister chamber; 2) a first outlet for reject steam, wherein said outlet comprises an adjustable shutter mechanism; and 3) a second outlet for clean steam, wherein said second outlet is located at a top portion of the demister chamber, and wherein said second outlet comprises an adjustable downcomer tube, wherein the demister chamber is located within the boiling chamber; and
a reverse mineral filter in at least vapor communication with said outlet for clean steam, said reverse mineral filter comprising 1) a chamber through which water can flow but resident particles will not exit; and 2) an assortment of resident particles, said resident particles comprising at least one mineral dissolvable in water passing through the chamber.

* * * * *